(12) United States Patent
Gonzalez

(10) Patent No.: US 11,687,703 B2
(45) Date of Patent: Jun. 27, 2023

(54) SHORTCUT TO MOVE A SELECTION INTO A NEW DOCUMENT

(71) Applicant: Dropbox, Inc., San Francisco, CA (US)

(72) Inventor: Gustavo Gonzalez, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 65 days.

(21) Appl. No.: 15/720,803

(22) Filed: Sep. 29, 2017

(65) Prior Publication Data

US 2018/0189256 A1 Jul. 5, 2018

Related U.S. Application Data

(60) Provisional application No. 62/440,706, filed on Dec. 30, 2016.

(51) Int. Cl.

| | | |
|---|---|---|
| G06F 17/00 | (2019.01) | |
| G06F 40/169 | (2020.01) | |
| G06F 40/134 | (2020.01) | |
| G06F 40/166 | (2020.01) | |
| G06F 40/177 | (2020.01) | |
| G06F 40/106 | (2020.01) | |
| G06F 40/174 | (2020.01) | |
| G06F 40/197 | (2020.01) | |

(52) U.S. Cl.
CPC .......... *G06F 40/169* (2020.01); *G06F 40/134* (2020.01); *G06F 40/166* (2020.01); *G06F 40/177* (2020.01); *G06F 40/106* (2020.01); *G06F 40/174* (2020.01); *G06F 40/197* (2020.01)

(58) Field of Classification Search
CPC .. G06F 17/241; G06F 17/2235; G06F 40/169; G06F 40/134; G06F 40/166; G06F 40/177; G06F 40/197; G06F 40/106; G06F 40/174
See application file for complete search history.

(56) References Cited

U.S. PATENT DOCUMENTS

| | | | |
|---|---|---|---|
| 5,806,065 A * | 9/1998 | Lomet | G06F 17/30327 707/610 |
| 5,946,697 A * | 8/1999 | Shen | H03M 7/30 707/E17.12 |
| 6,405,225 B1 | 6/2002 | Apfel et al. | |
| 7,191,400 B1 * | 3/2007 | Buvac | G06F 16/958 707/E17.116 |

(Continued)

OTHER PUBLICATIONS

MJ Tube, Dec. 10, 2015, https://www.youtube.com/watch?v=Z5-5m51GwS0, "How to Exact Copy & Paste Excel Data into Word Table".*

(Continued)

*Primary Examiner* — Mohammed H Zuberi
(74) *Attorney, Agent, or Firm* — Keller Preece PLLC

(57) ABSTRACT

A computer implemented method that renders a document and receives a selection of a portion of the rendered document along with a linked document command from a user. The method prompts the user for a title for a new document for the selected portion. Creating a new document in response to receiving a title with the selected portion inserted into the new document. The method further includes replacing the selected portion with the title in the rendered document, with the title being a link to the new document.

20 Claims, 29 Drawing Sheets

(56) References Cited

U.S. PATENT DOCUMENTS

| | | | |
|---|---|---|---|
| 7,458,014 B1 | 11/2008 | Rubin et al. | |
| 7,574,675 B1 | 8/2009 | Linker et al. | |
| 8,060,394 B2 | 11/2011 | Woodings et al. | |
| 8,332,747 B2 | 12/2012 | Carro et al. | |
| 8,510,649 B2 | 8/2013 | Isidore | |
| 8,683,312 B2* | 3/2014 | McAfee | G06F 40/134 717/109 |
| 9,465,784 B1* | 10/2016 | Hagopian | G06F 40/197 |
| 2003/0072031 A1* | 4/2003 | Kuwata | H04N 1/00137 358/1.15 |
| 2003/0227487 A1 | 12/2003 | Hugh | |
| 2006/0026516 A1 | 2/2006 | LeGrys et al. | |
| 2009/0198779 A1* | 8/2009 | Agrawal | G06Q 10/107 709/206 |
| 2009/0241183 A1 | 9/2009 | Boss et al. | |
| 2010/0031190 A1 | 2/2010 | Hall et al. | |
| 2010/0058176 A1 | 3/2010 | Carro et al. | |
| 2010/0114977 A1 | 5/2010 | Bacher et al. | |
| 2010/0275109 A1* | 10/2010 | Morrill | G06F 40/274 715/261 |
| 2012/0078896 A1* | 3/2012 | Nixon | G06F 16/90 707/732 |
| 2013/0198621 A1 | 8/2013 | Wade et al. | |
| 2013/0219255 A1* | 8/2013 | van Hoff | G06F 16/958 715/205 |
| 2013/0268850 A1 | 10/2013 | Kyprianou | |
| 2014/0019562 A1* | 1/2014 | Le Chevalier | G06F 40/106 715/230 |
| 2014/0053061 A1* | 2/2014 | Chasen | G06F 17/2247 715/234 |
| 2014/0281864 A1* | 9/2014 | Frankel | G06F 40/134 715/208 |
| 2015/0095458 A1* | 4/2015 | DeRoller | H04L 67/1095 709/219 |
| 2015/0154224 A1* | 6/2015 | Cui | G06F 9/52 707/620 |
| 2016/0147718 A1* | 5/2016 | Spyropoulos | G06F 3/04812 715/205 |
| 2017/0308511 A1* | 10/2017 | Beth | G06F 40/169 |
| 2018/0189246 A1 | 7/2018 | Tene et al. | |
| 2019/0065615 A1* | 2/2019 | Room | G06F 3/0482 |

OTHER PUBLICATIONS

Office Action for U.S. Appl. No. 15/720,803 dated Aug. 6, 2019, 12 pages.

Office Action for U.S. Appl. No. 15/720,803 dated Nov. 15, 2018, 16 pages.

Kaufman, "How to Insert the Contents of One World Document into Another," How-To Geek, accessible online at http://www.howtogeek.com/243422/how-to-insert-the-contents-of-one-word-document-into-another/, Feb. 26, 2016.

U.S. Appl. No. 15/720,765, filed Nov. 23, 2018, Office Action.

U.S. Appl. No. 15/720,765, filed Jun. 13, 2019, Notice of Allowance.

U.S. Appl. No. 15/720,765, filed Oct. 9, 2019, Notice of Allowance.

* cited by examiner

SHORTCUT TO MOVE A SELECTION INTO A NEW DOCUMENT

CLAIM OF PRIORITY UNDER 35 U.S.C. § 119

The present Application for Patent claims priority to U.S. Provisional Application No. 62/440,706 entitled "SHORTCUT TO MOVE A SELECTION INTO A NEW DOCUMENT" filed Dec. 30, 2016, which is hereby expressly incorporated by reference herein for all purposes.

TECHNICAL FIELD

The disclosed embodiments generally relate to using a shortcut to move a selection into a new document and more specifically relates to selecting a portion of a rendered document, inserting the selected portion into a new document and replacing the selected portion with a link to the new document.

BACKGROUND

Documents can become large, slow and difficult to use. For example, opening a document takes longer for larger documents in comparison to shorter documents. If the document being opened is stored remotely, bandwidth of the downlink can delay the opening of the document. In some situations, the document can be for a single user or can be a collaborative document having multiple users associated with the document. A document can be can be updated and/or supplemented periodically, e.g., weekly, or on an event basis. For example, a document can be a status document for a weekly meeting with the status of outstanding items and new items being updated or supplemented for events that occurred since the last update. If the same document is used for the year, the earlier entries can become less relevant as the year progresses. For example, entries that occurred in January may not be as important as entries that have occurred more recently. Although the earlier entries may be less important, the user or users may still want access to them. Thus, there is a need to reduce the size of a such a document but also to allow access to all of the entries.

The figures depict various embodiments of the present invention for purposes of illustration only. One skilled in the art will readily recognize from the following description that other alternative embodiments of the structures and methods illustrated herein may be employed without departing from the principles of the invention described herein.

SUMMARY OF THE INVENTION

Additional features and advantages of the disclosure will be set forth in the description which follows, and in part will be obvious from the description, or can be learned by practice of the herein disclosed principles. The features and advantages of the disclosure can be realized and obtained by the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for selecting content from a rendered document, generating a new document, inserting the selected content into the new document, and replacing the selected content in the rendered document with a link to the new document. The disclosed technology addresses the need in the art for an efficient method to reduce the size of a document without losing the content.

DETAILED DESCRIPTION

The present application is directed to computer implemented methods, apparatuses and non-transitory computer readable mediums that allows a user to select content from a rendered document, generate a new document, insert the selected content into the new document, and replace the selected content in the rendered document with a title to the new document with the title being a link to the new document. In addition, if the selected content contains comments, tables and/or edits, the comments, tables and/or edits are associated with the selected content that is inserted into the new document. As a result, the size of the rendered document can become smaller without losing the original content. If a user clicks on an inserted title in the rendered document, the document associated with the title can be displayed or rendered.

System Overview

Figure 1:
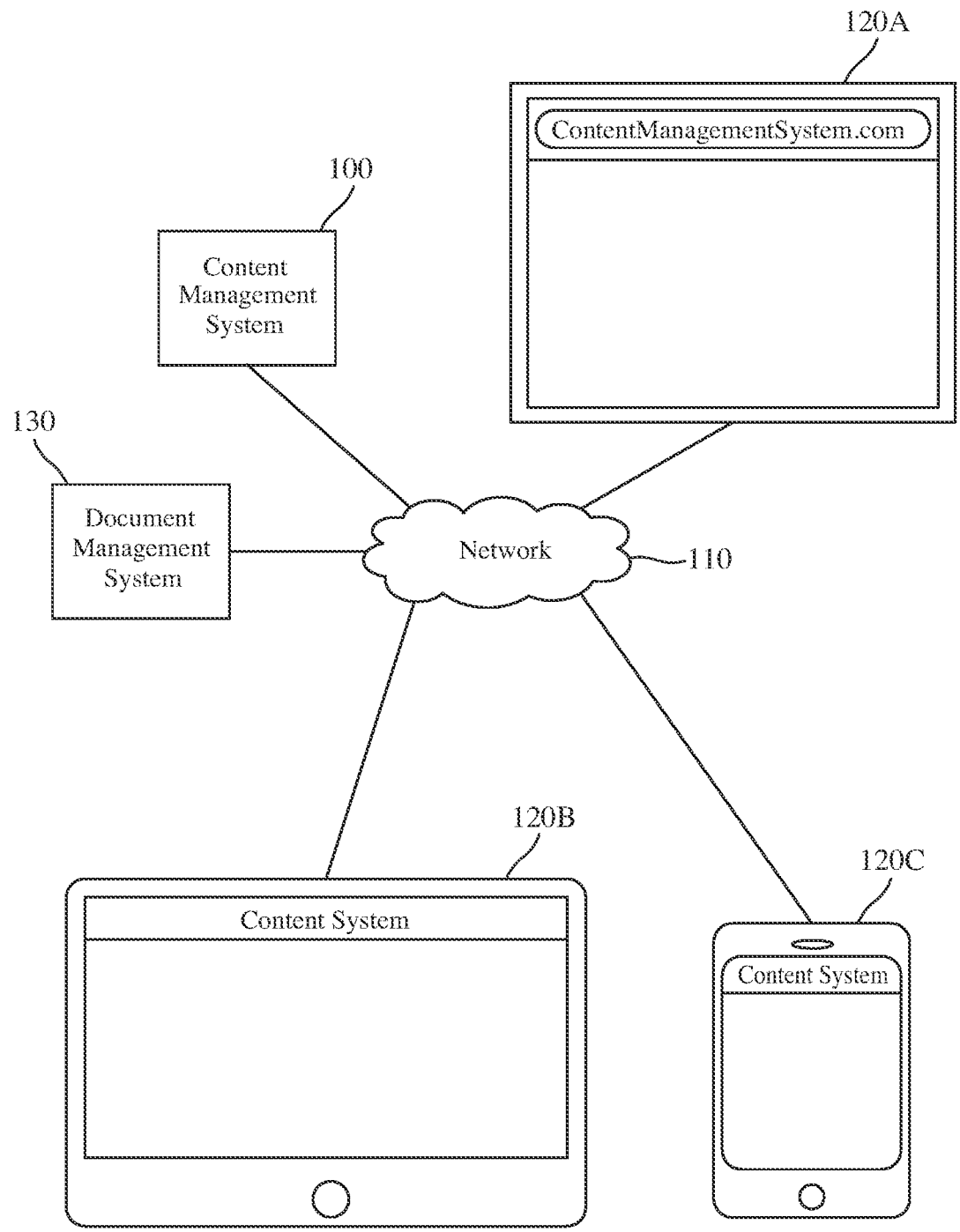
FIG. 1 is a system diagram of a system environment of a content management system and a document management system in accordance with an exemplary embodiment.

FIG. 1 shows a system environment including content management system 100, document management system 130 and client devices 120A, 120B, 120C (collectively or individually "120"). Content management system 100 provides content sharing, synchronization for users of client devices 120. These services allow users to share content with other users of client devices 120. In addition to content sharing, content management system 100 updates shared content responsive to changes and enables users to synchronize changes in content across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file. The content stored by content management system 100 may be organized in one configuration in folders, tables, or in other database structures (e.g., object oriented, key/value etc.). In one embodiment, the content shared by content management system 100 includes content created by using third party applications, e.g., word processors, video and image editors, database management systems, spreadsheet applications, code editors, and so forth, which are independent of content management system 100.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Document management system 130 provides users of client devices 120 with the ability to create, store, access, and share documents. Documents are computer files that a user can create using a documents editor, such as a document editor which can be hosted by the document management system 130, or a document editor 270 provided on client device 120.

Client Device

Figure 2:
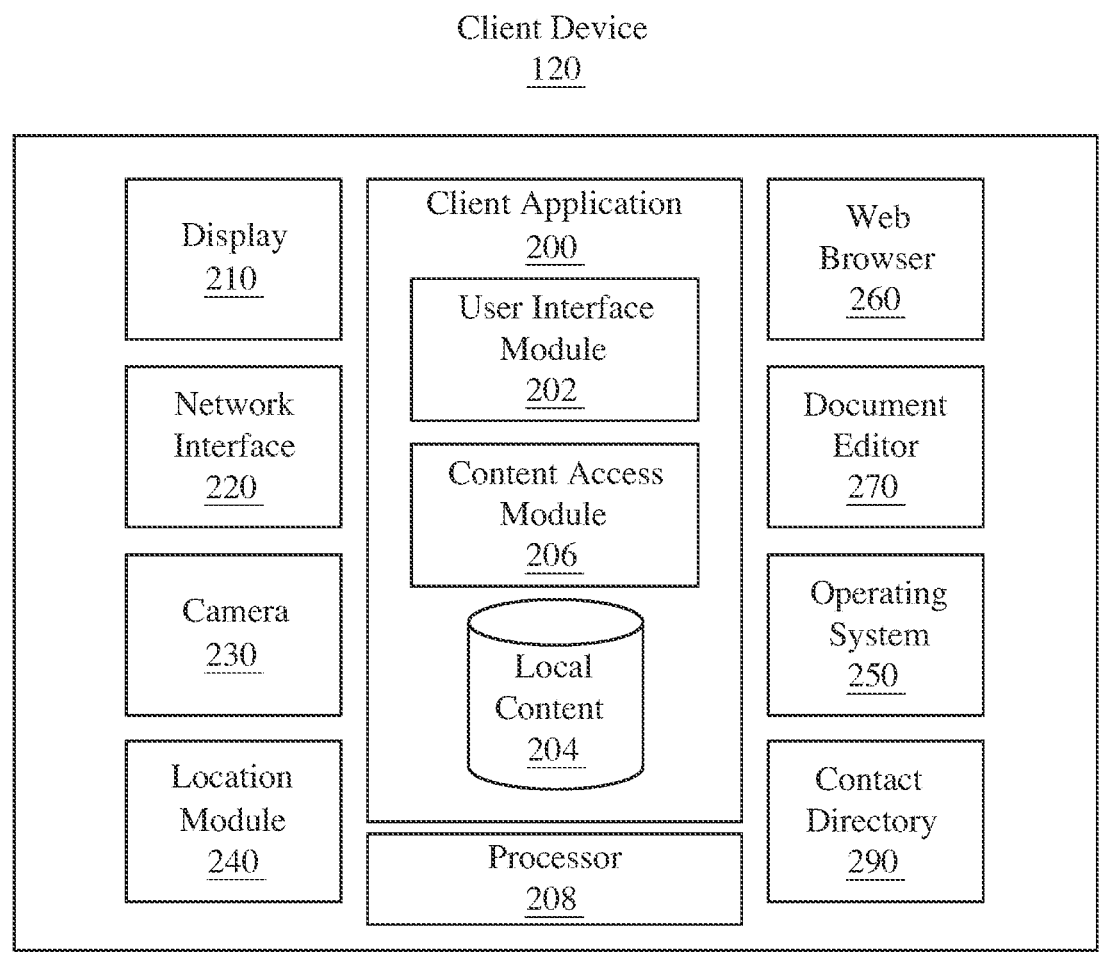
FIG. 2 is a block diagram of the components of a client device in accordance with an exemplary embodiment.

FIG. 2 shows a block diagram of the components of a client device 120 according to one embodiment. Client devices 120 generally include devices and modules for communicating with content management system 100 and a user of client device 120. Client device 120 can include a display 210 for providing information to the user, and in certain client devices 120 includes a touchscreen. Client device 120 can also include a network interface 220 for communicating with content management system 100 via network 110. Client device 120 can include one or more processors 208 for executing software, modules and/or components. Other components of a client device 120 that are not material are not shown, for example, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and optionally a document editor 270. Document editor 270 is configured for creating, viewing and modifying documents such as text documents, code files, mixed media files (e.g., text and graphics), presentations or the like. Operating system 250 and/or the one or more processors 208 on each device provides a local file management system and executes the various software modules such as content management system client application 200 and document editor 270. A contact directory 290 stores information on the user's contacts, such as name, telephone numbers, company, email addresses, physical address, website URLs, and the like.

Client devices 120 communicate with content management system 100 and document management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Client devices 120 access content management system 100 and document management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100 and document management system 130. Client application 200 includes user interface module 202 that generates an interface to the content accessed by client application 200. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as document editor 270, when client application 200 is not in communication with content management system 100. Content access module 206 manages updates to local content 204 and communicates with content management system 100 to synchronize content modified by client device 120 with content maintained on content management system 100. Client application 200 may take various forms, such as a stand-alone application, an application plug-in, or a browser extension.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Content Management System

Figure 3:
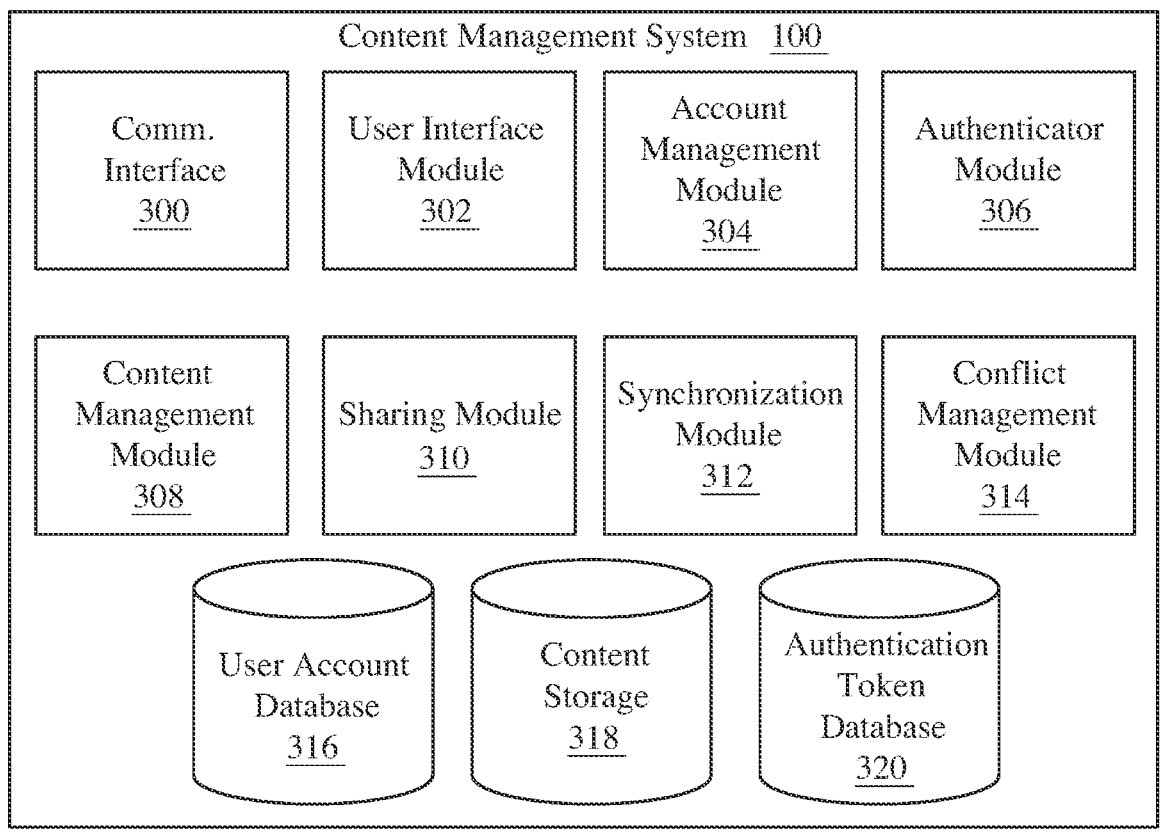
FIG. 3 is a block diagram of the content management system in accordance with an exemplary embodiment.

FIG. 3 shows a block diagram of the content management system 100 according to one embodiment. To facilitate the various content management services, a user can create an account with content management system 100. The account information can be maintained in user account database 316. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a userID and a user name. For purposes of convenience, references herein to information such as documents or other data being "associated" with a user are understood to mean an association between a document and either of the above forms of user identifier for the user. Similarly, data processing operations on documents and users are understood to be operations performed on corresponding identifiers such as documentID and userIDs. For example, a user may be associated with a document by storing the information linking the userID and the documentID in a table, file, or other storage formats. For example, a database table organized by documentIDs can include a column listing the userID of each user associated with the document. As another example, for each userID, a file can list a set of documentIDs associated with the user. As another example, a single file can list key values pairs such as <userID, documentID> representing the association between an individual user and a document. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then use a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable method, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API). Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 310 for sharing content publicly or privately. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 308 for maintaining a content directory that identifies the location of each content item in content storage 318, and allows client applications to request access to content items in the storage 318. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which can later be used by content management system 100 to identify properly and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Document Management System

Figure 4:
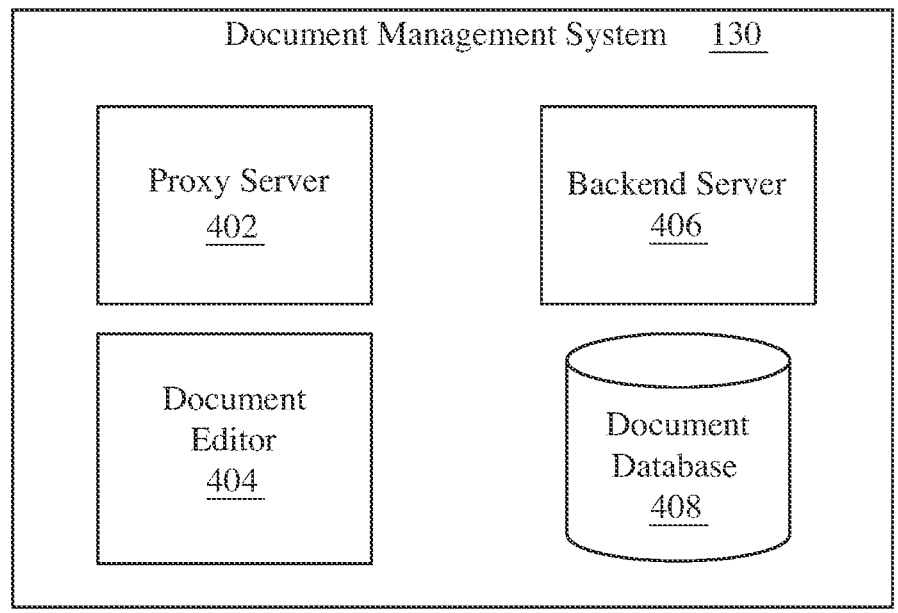
FIG. 4 is a block diagram of the document management system in accordance with an exemplary embodiment.

FIG. 4 shows a block diagram of the document management system 130, according to one embodiment. Like other content items, documents may be shared and synchronized with multiple users and client devices 120, using sharing 310 and synchronization 312 modules of content management system 100. Users operate client devices 120 to create and edit documents, and to share documents with other users of client devices 120. Changes to a document by one client device 120 are propagated to other client devices 120 of users associated with that document.

In the embodiment of FIG. 1, document management system 130 is shown as separate from content management system 100, and can communicate with it to obtain its services. In other embodiments, document management system 130 is a subsystem of the component of content management system 100 that provides sharing and collaboration services for various types of content items. User account database 316 and authentication token database 320 from content management system 100 are used for accessing document management system 130 described herein.

Document management system 130 includes various servers for managing access and edits to documents. Document management system includes proxy server 402, document editor 404, and backend server 406. Proxy server 402 is responsible for handling requests from client applications 200 and passing those requests to the document editor 404. Document editor 404 manage application level requests for client applications 200 for editing and creating documents, and selectively interacting with backend servers 406 for processing lower level processing tasks on documents, and interfacing with documents database 408 as needed.

Client application 200 sends a request relating to a document to proxy server 402. Generally, a request indicates the userID ("UID") of the user, and the documentID ("NID") of the document, and additional contextual information as appropriate, such as the text of the document. When proxy server 402 receives the request, the proxy server 402 passes the request to the document editor 404. Proxy server 402 also returns a reference to the identified documents server 404 to client application 200, so the client application can directly communicate with the document editor 404 for future requests. In an alternative embodiment, client application 200 initially communicates directly with a specific document 404 assigned to the userID.

When a documents editor 404 receives a request, it determines whether the request can be executed directly or by a backend server 406. When the request adds, edits, or otherwise modifies a document the request is handled by the document editor 404. If the request is directed to a database or index inquiry, the request is executed by a backend server 406. For example, a request from client device 120 to view a document or obtain a list of documents responsive to a search term does not modify documents and is processed by backend server 406.

Content management system 100 and document management system 130 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 GB to 2Tb of computer readable, persistent storage, and running an operating system such as LINUX or variants thereof. The operations of content management system 100 and document management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, documents servers, failover servers, network management tools and so forth are not shown so as not to obscure the features of the system. Finally, the functions and operations of content management system 100 and document management system 130 are sufficiently complex as to require implementation on a computer system, and cannot be performed in the human mind simply by mental steps.

Sample Document

Figure 5A:
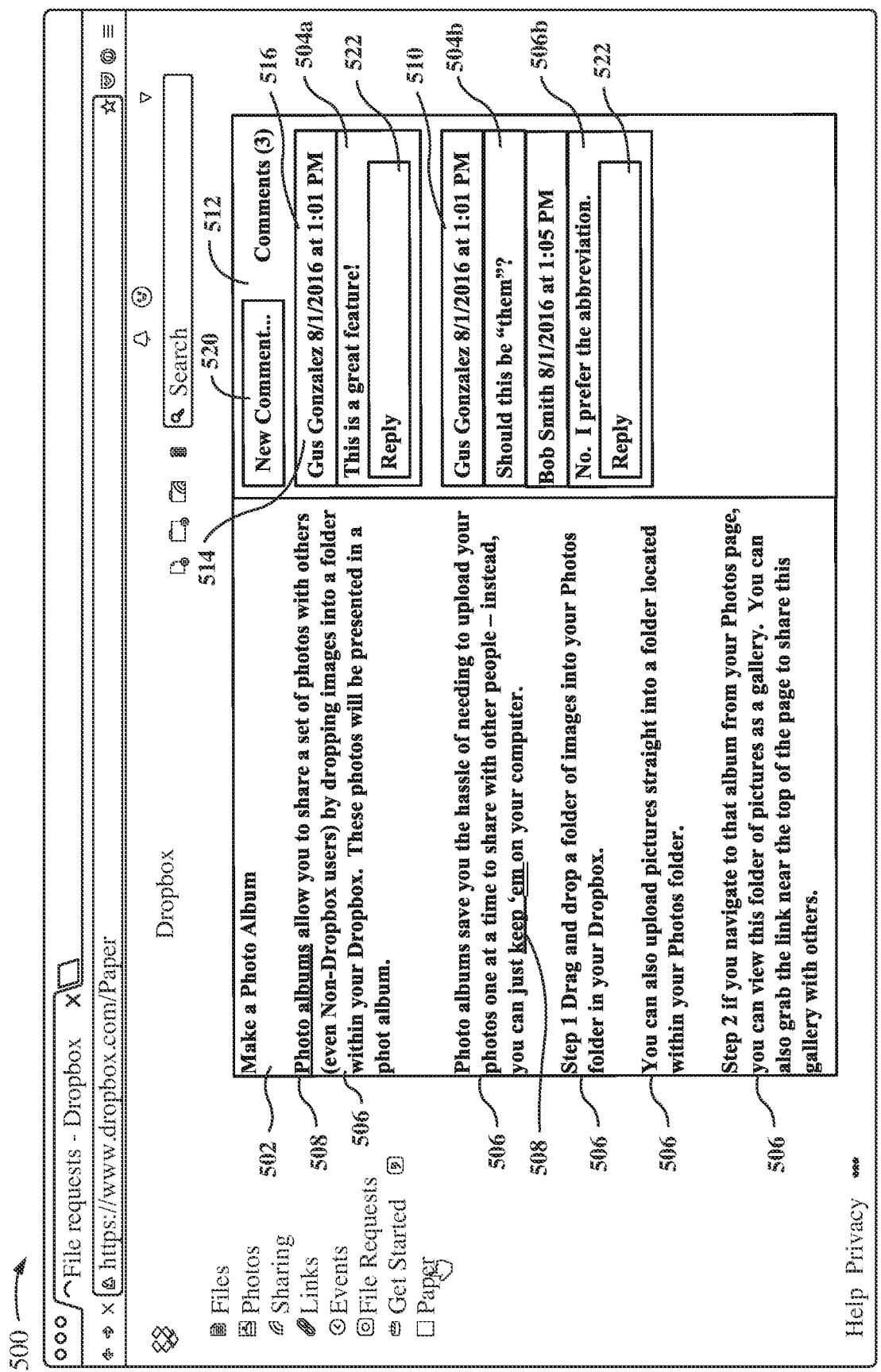
FIG. 5A is a user interface rendering a page of a document in accordance with an exemplary embodiment.

Referring now to FIG. 5A, a user interface rendering a page of a document in accordance with an exemplary embodiment is illustrated. As shown, a document 502 entitled "Make a Photo Album," having several comments 504 is rendered in the user interface 500. Generally, a document 502 is composed of lines of text arranged in paragraph blocks 506. A document can have zero, one or more comments 504. The presence of comments 504 may be indicating by underlining (preferably colored underlined) portions 508 of text, though any other formatting may be used to indicate the presence of a comment 504 (e.g., lines connecting the comments to the text, comment numbers in superscript form, etc.). The portion 508 of text with which a comment is associated is also called a text span. The first comment 504a is applied to the text span, "Photo albums." Comments 504 can be associated with overlapping text spans; the second comment 504b is applied to the text span, "keep 'em" and the third comment 504c is applied to the text span "'em." The comments 504 are arranged in a comment pane 512 typically positioned to the side of the body of the document 502. Each comment 504 can have an author 514 (indicated by user name) and a creation date and time 516. A collection of comments that together form an exchange between users with respect to a single text span is a thread 510. Threads are displayed proximate the text span that is associated with the thread. In the example of FIG. 5A, there is one thread 510 which includes the comments from Gus Gonzalez and Bob Smith.

A user may create a new comment or reply to existing comment. To create a comment, a user selects a span of text in the document, and activates a comment function, for example via button 520, menu or other input. The new comment 504 is displayed in the comment pane 512, indicating the user name 514 and creation date and time 516, and the user may then enter text for the comment therein. The user can apply text formatting to the text of the comment as done for formatting the text of the document. A user may also create a comment to be included in a thread by entering text into a reply field 522 in one of the comments 504, such as the most recent comment in a thread 518.

Database Structures

Figure 6:
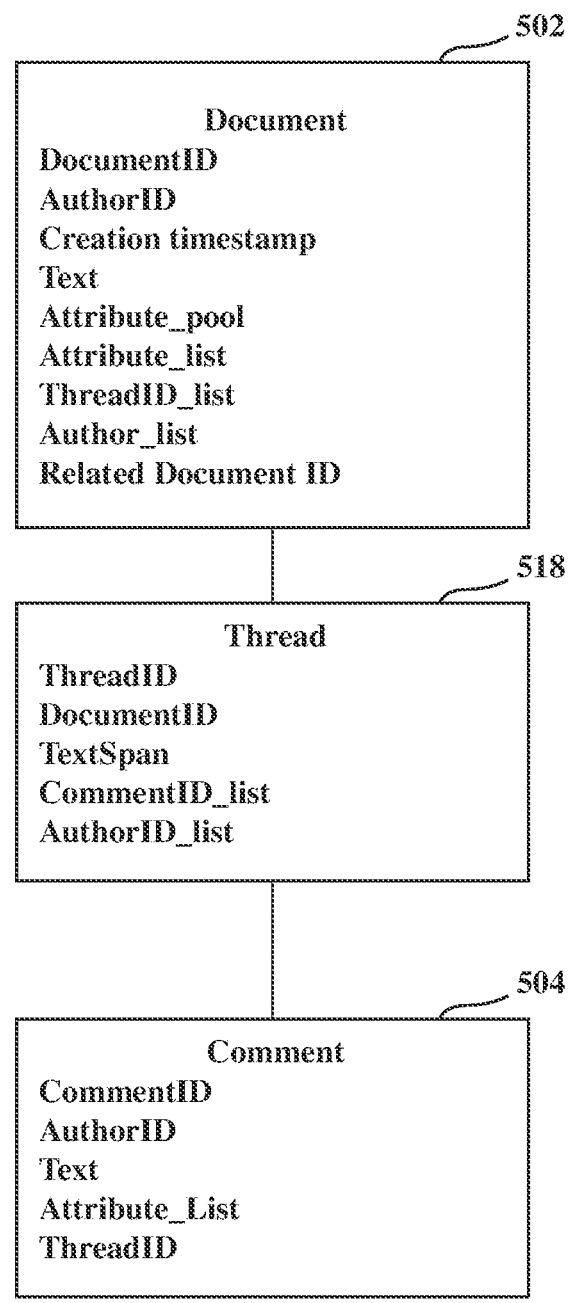
FIG. 6 is a block diagram of data structures for documents, comments, and threads.

Referring to FIG. 6, document database 408 stores the documents, comments, and threads as database entities, and provides programmatic access thereto for searching and retrieving these entities. Database 408 can be implemented in a relational form using separate tables for documents, threads, and comments, or using objects, BLOBs, files, or other structures.

Each document 502 is composed of a number of elements (equivalently fields, columns, or attributes). In one embodiment the elements are as follows:

DocumentID: a unique identifier assigned by the document management system 130 to access the document.

AuthorID: the userID of the user who created the document, and may include the user name of the user. These values may be encrypted for privacy.

Creation timestamp: indicates the date and time that the document was created.

Text: The text of the document is represented as string of ASCII characters.

Attribute_pool: Formatting attributes (e.g., bold, underline, italics, font, font size, line spacing, paragraphs, and the like) that are used in the document. The attribute pool is a set of attributeIDs used in the document; a native set of attributeIDs and associated formats are provided by the document management system 130. The following table is an example of a portion of an attribute pool:

| Attribute ID | Formatting |
| --- | --- |
| 0 | None |
| 1 | Bold |
| 2 | Italic |
| 3 | Underline |
| 4 | Strikethrough |
| 5 | Superscript |
| 6 | Subscript |
| 7 | Single space |
| 8 | Double space |
| ... | ... |

Attribute_list: Formatting attributes are applied to portions of the text by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the document is coded for attributes. For example, the text "Text with bold, italic, and bold italic formatting." would be attribute coded as {10=0, 4=1, 2=0, 6=2, 5=0, 11=12, 12=0}.

ThreadID_list: a list of all threads 518 that are associated with a document.

Author list: a sequential list of the users who have contributed to the document text, according to the sequence of contributed or edited text portions, using the same coding pattern as the attribute list, i.e., (span=userID) pairs. For example, the author list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

Related DocumentID: a list of one or more DocumentIDs for documents that are linked to the present document. Linked documents are explained below in further detail.

The span coding of the attributes and authors can be beneficial because the span coding allows for efficient management of insertions and deletions of text. When text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example with the userID of each author followed by a list of text portions edited by that user.

Each thread 518 includes the following elements:

ThreadID: unique identifier assigned by the document management system.

DocumentID: the documentID of the document that contains the thread.

TextSpan: the text span element identifies the portion of text of the document to which the thread applies, using the character position of the first character in the selected text, and the length of the portion. For example, the text span (50, 25) indicates a text portion starting at character position 50 within the document and running 25 characters in length.

CommentID_list: a list element of CommentIDs of the comments 504 included in the thread 518.

AuthorID_list: the userID of the authors of comments in the thread.

Each comment 504 includes the following elements:

CommentID: a unique identifier assigned by the document management system 130.

AuthorID: the userID of the author of the comments.

Text: a string element storing the text of the comment.

Attribute_list: attribute list element storing the formatting attributes for the text of the comment, in the same manner as described above for documents.

ThreadID: the ThreadID of the thread to which the comment belongs.

Document database 408 can also include a set of indices. These indices are logical in nature and can be implemented in various ways, depending on the underlying database design. A user index can contain a list of all users by their userID, and for each userID there can be a list of documentIDs. Each documentID identifies a document to which the user of the userID is associated with and has access to. For each documentID, there can be a status indicator that indicates whether the document is active or inactive for the user. A document is active for the user sharing the document until the user deletes the document. In one embodiment, when the user deletes the document, the document persists in the document database 408 and remains associated with the user but the status indicator is set to inactive, allowing the user to reactivate their sharing status with the document in the future. The document remains active for and associated with any other shared users. Alternatively, the document may be deleted from the document database 408, so that none of the shared users have access to it anymore. The user index can be used to identify documents associated with (shared with) a given user and the status of those documents with respect to the user.

Documents database 408 can include a document index. The document index indicates, for each document, a list of userIDs of users having access to the document, and an indication of whether the user is active or inactive. This index can be an inverse of the user index and may be stored together with the user index. For each documentID, there can be also be a list of the privileges for each document. The privileges can be read only, read/write or any other known privilege. Read only privilege only allows a user to view or read a document. Read/write privilege allows a user to view and edit a document.

Figure 7A:
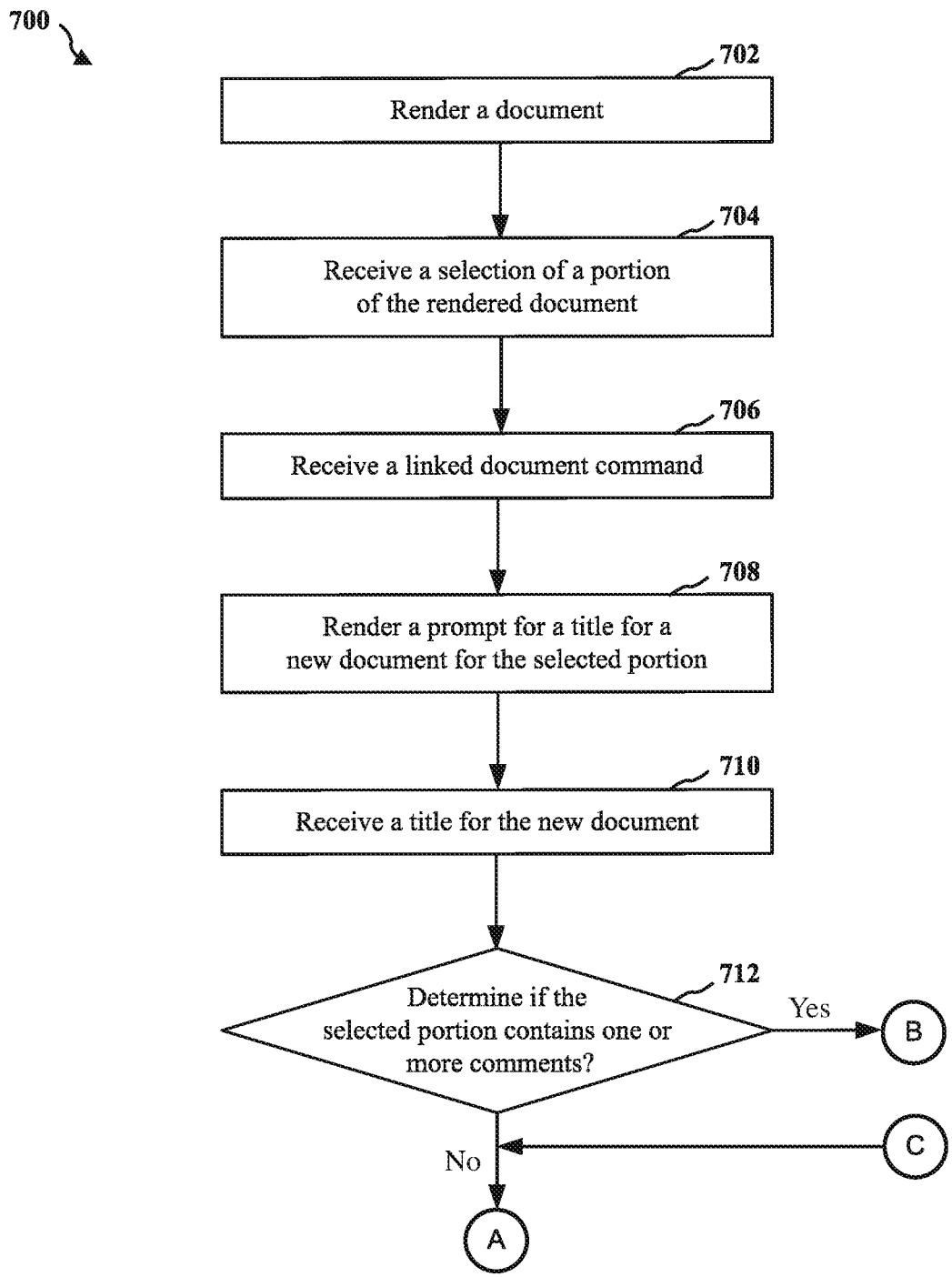
FIGS. 7A-7C is a flow diagram of a method for executing a linked document command in accordance with an exemplary embodiment.
Figure 7B:
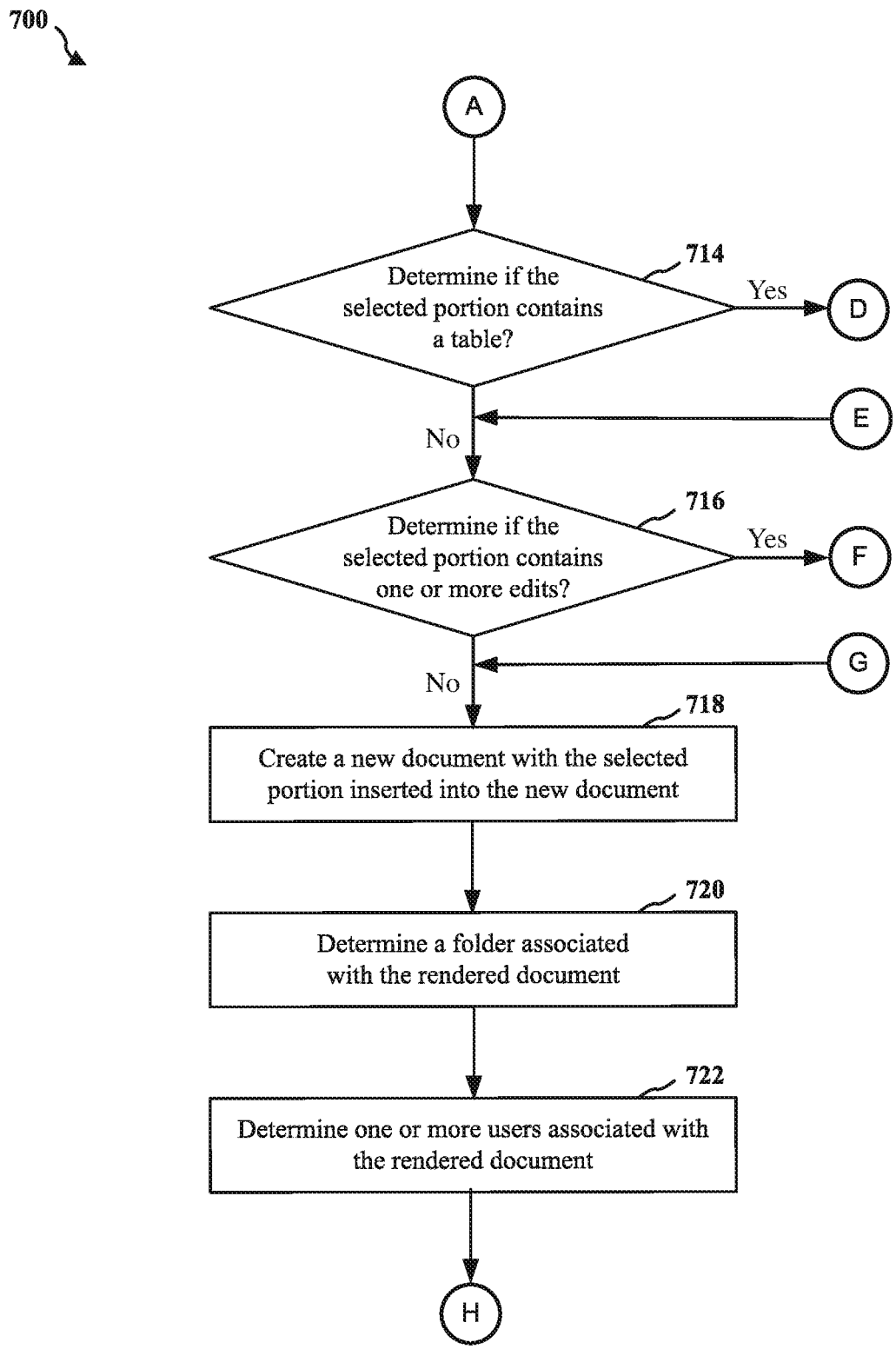
Figure 7C:
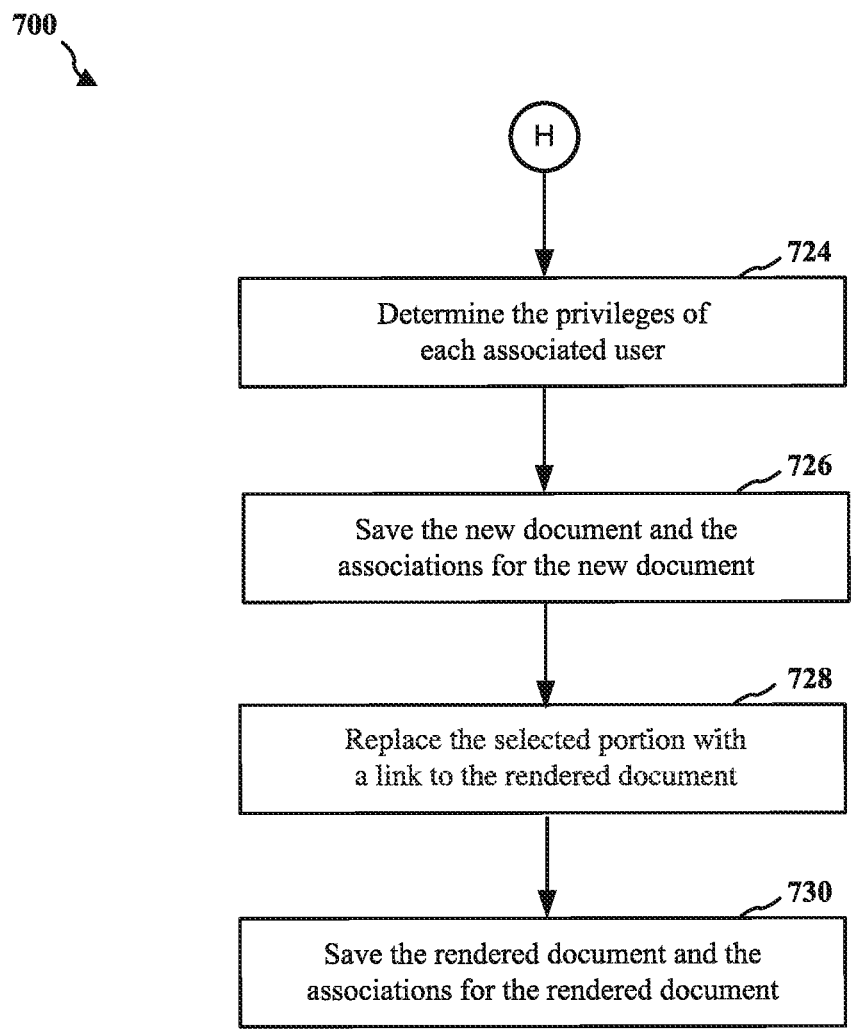

Referring to FIGS. 7A-7C, a flowchart for a method for executing a shortcut to move a selection of text from a document into a new document in accordance with an exemplary embodiment is illustrated. Exemplary method 700 is provided by way of example, as there are a variety of ways to carry out the method. Method 700 described below can be carried out using the configurations illustrated in FIGS. 1-6 by way of example, and various elements of these figures are referenced in explaining exemplary method 700. Each block shown in FIGS. 7A-7C represents one or more processes, methods or subroutines, carried out in exemplary method 700. Exemplary method 700 can begin at block 702.

At block 702, render a document. For example, a processor 208, a web browser 260, a document editor 270, a document editor 404, and/or the client application 200 of the client device 120 renders the document on the display 210 of client device 120. FIG. 5A shows a rendered document in user interface 500 on a display 210 of a client device 120. The rendered document can be performed or displayed in a native application based on an extension associated with the document. For example, a document having an extension of "docx" would be displayed in Microsoft® Word® and a document having an extension of "xlsx" would be displayed in Microsoft® Excel®. Microsoft® Word® and Microsoft® Excel® are products manufactured by Microsoft of Redmond, Wash. After rendering the document, the method 700 can proceed to block 704.

Figure 5B:
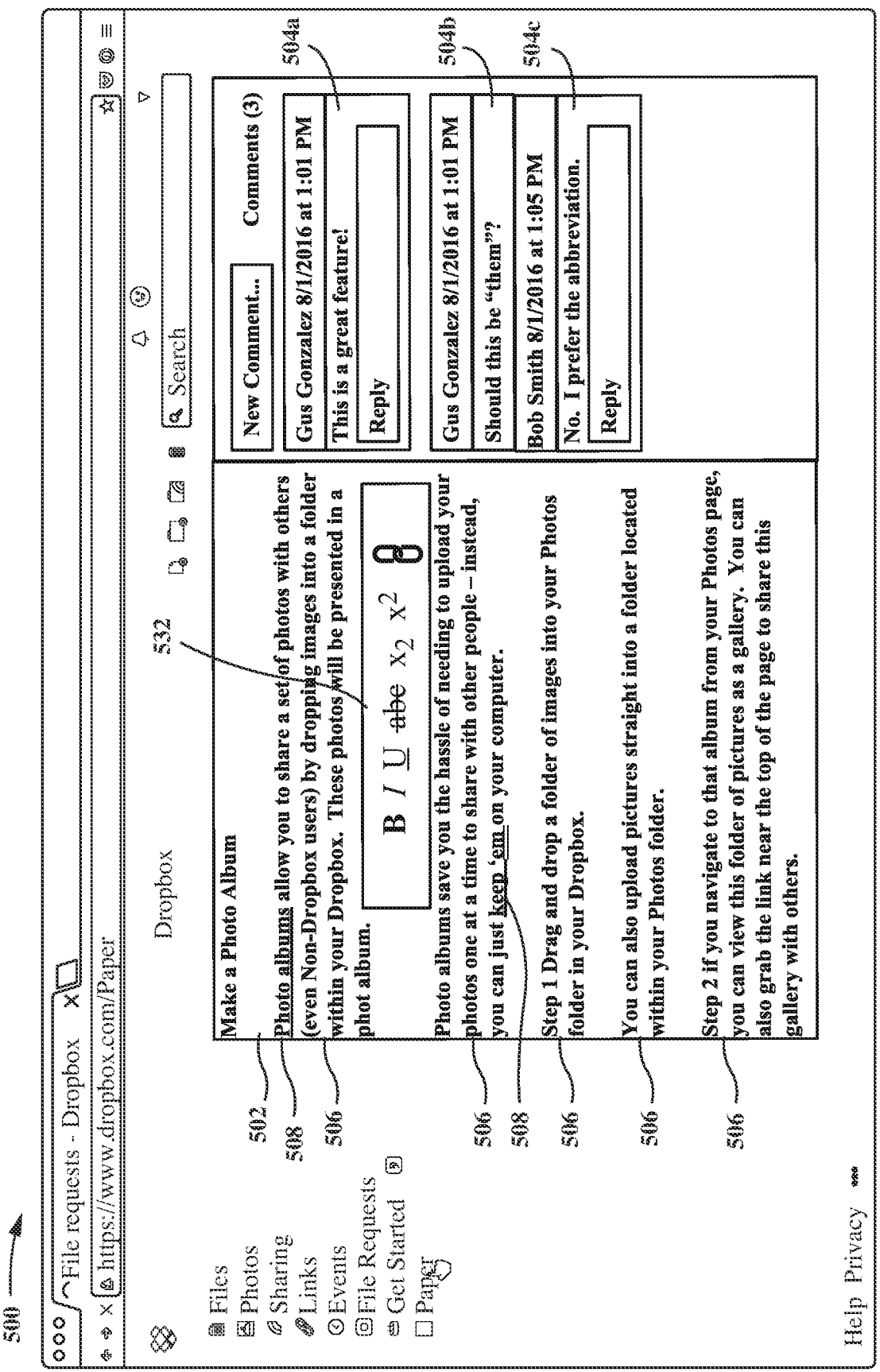
FIG. 5B is a user interface rendering a page of a document with a selected portion and a menu in accordance with an exemplary embodiment.

At block 704, receive a selection of a portion of the rendered document. For example, the processor 208, web browser 260, document editor 270, document editor 404, and/or client application 200 of the client device 120 receives a selection of a portion of the rendered document. FIG. 5B shows that the first paragraph of the document entitled, "Make a Photo Album," is selected. Although FIG. 5B shows the first paragraph being selected, the user can select a word, part of a sentence, a sentence, multiple sentences, a paragraph, multiple paragraphs, a table, part of a table, a page, multiple pages can be selected, part of a figure, a figure, part of a photograph, a photograph, or any part of a document can be selected. For example, a user can select text by using a left click on a mouse and dragging the mouse to select the text. The selection can include a starting point, e.g., a starting identifier, and an ending point, e.g., an ending identifier, to identify the selected portion. For example, the starting identifier can indicate the starting point of the selection, e.g., page, line number and index number within the line. The ending identifier can indicate the ending point of the selection, e.g., page, line number and index number within the line. The page can identify the page where the starting point or ending point is located. The line number can identify the line within the page that the starting point or ending is located. The index number can identify where within the line that the starting point or ending point is located. In an alternate embodiment, the starting identifier and ending identifier can each identify the line number and index number for the starting point and ending point, respectively, if the document does not identify pages. For example, each page can comprises 64 lines with the first page having lines 1-64, the second page having lines 65-128, etc. Alternatively, the selection can include a starting point and a length. The starting point identifies where the selection begins and the length can indicate the length of the selection from the starting point. After receiving the selection of the portion of the rendered document, the method 700 can proceed to block 706.

At block 706, receive a linked document command. For example, the processor 208, web browser 260, document editor 270, document editor 404, and/or client application 200 of the client device 120 receives a linked document command associated with the selection of the portion of the document. The linked document command for the linked document command can be received as a result of the user entering a shortcut key pattern, the user entering a gesture or the user selecting a linked document command from a menu. The menu can be displayed on the user interface or from the user causing a menu to be displayed (e.g., a right click on the mouse) and the user selected the linked document command from the menu. FIG. 5B shows a pop menu 532 having a linked document icon, shown as a chain link. One of ordinary skill in the art can appreciate that other text or symbols can be used in pace of the linked document icon. As shown, the popup menu 532 can include common menu commands, such as such as bold ("B"), italics ("I"), underline ("U"), strikethrough ("abc"), subscript ("$x_2$") and superscript ("$x^2$"). The user can select the linked document command/icon from the popup menu 532. After receiving a linked document command, the method 700 can proceed to block 708.

Figure 5C:
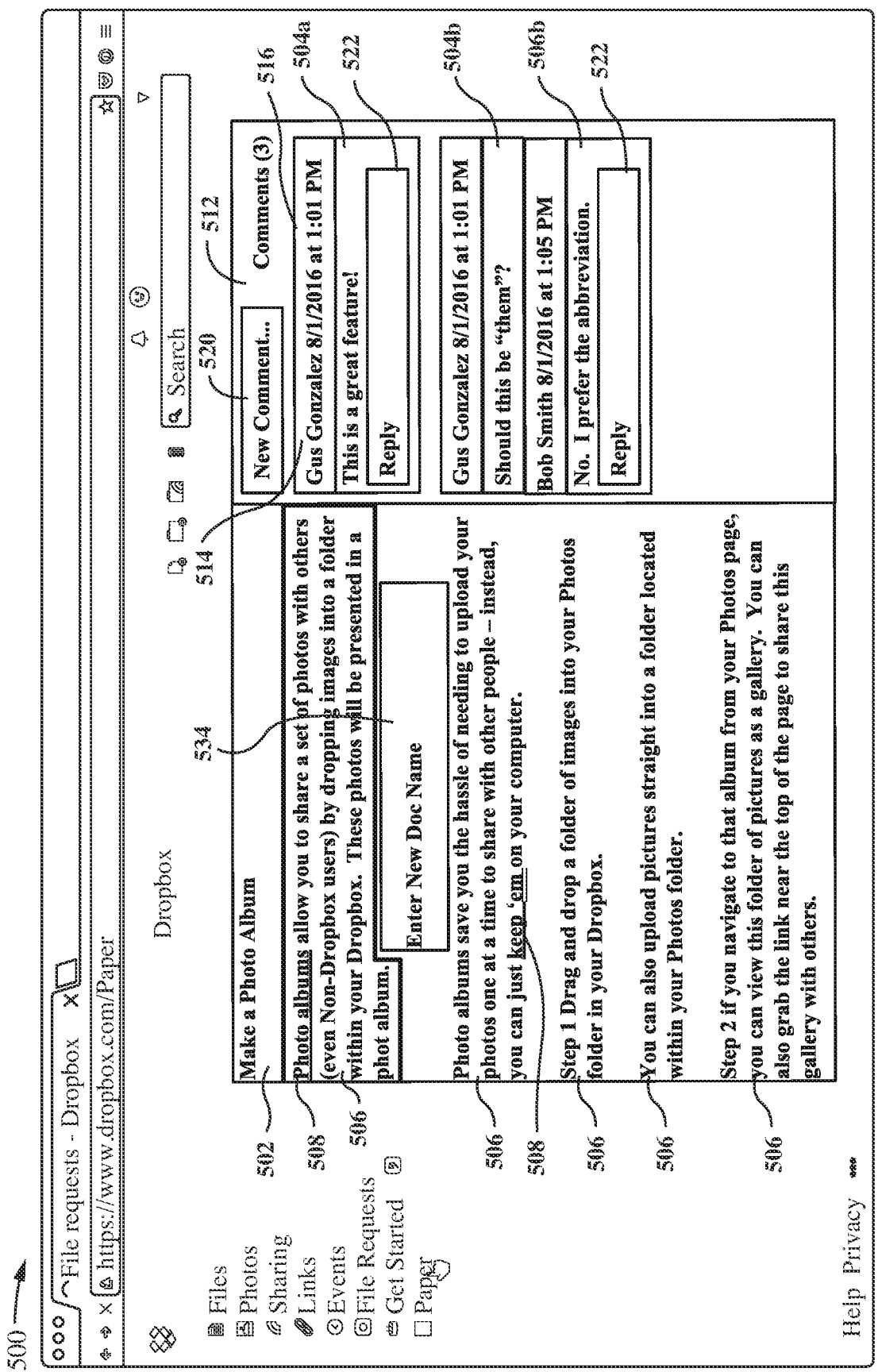
FIG. 5C is a user interface rendering a page of a document and a prompt for a title for a new document in accordance with an exemplary embodiment.

At block 708, render a prompt for a title for a new document for the selected portion. For example, the processor 208, web browser 260, document editor 270, document editor 404, and/or client application 200 of the client device 120 renders a prompt 534 for a title for the new document for the selected portion in response to receiving the linked document command. FIG. 5C shows a prompt for the title 534. After rendering a prompt for the title for the new document, the method 700 can proceed to block 710.

Figure 5D:
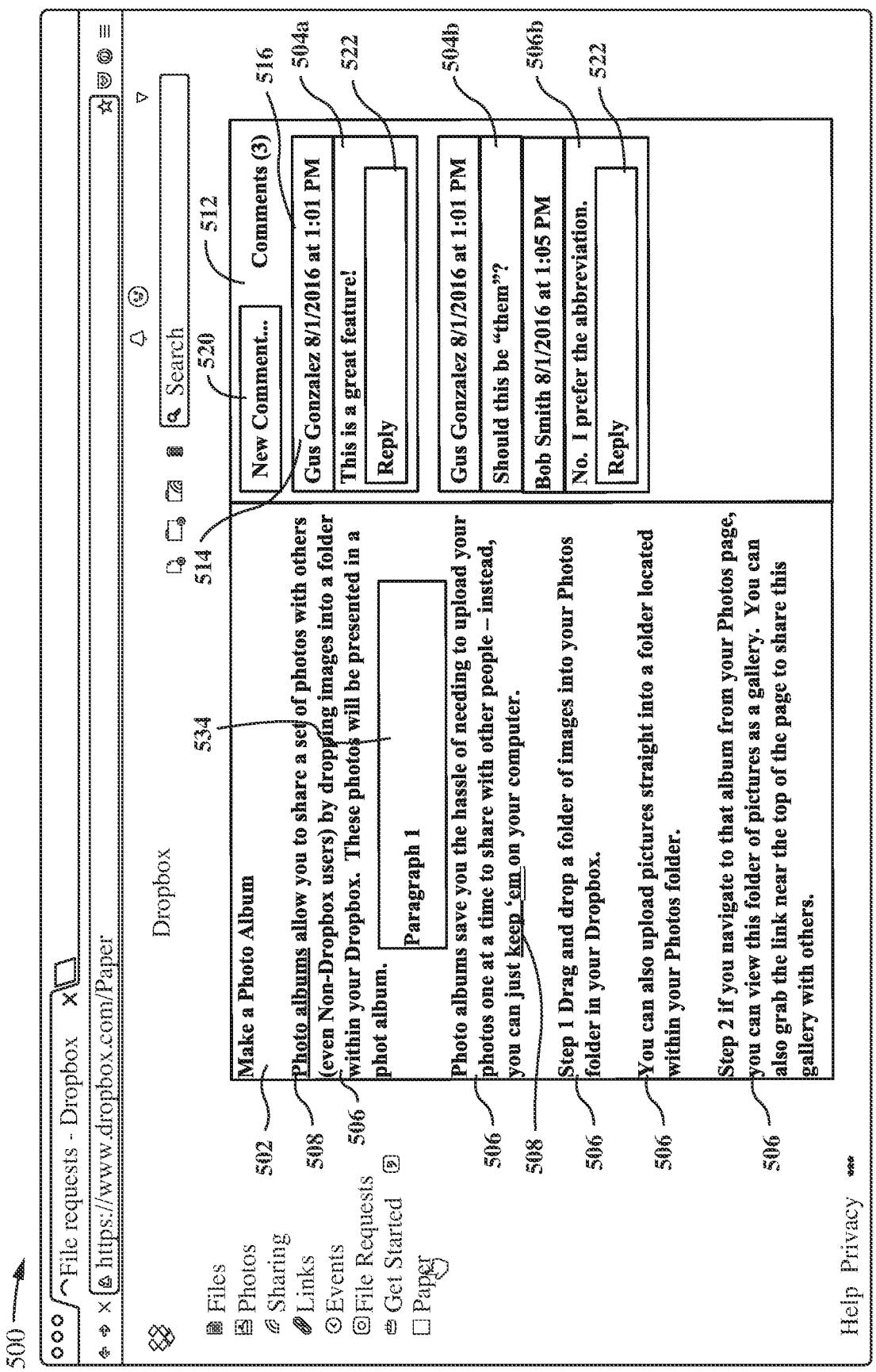
FIG. 5D is a user interface rendering a page of a document and a title for a new document in accordance with an exemplary embodiment.

At block 710, receive a title for the new document. For example, the processor 208, web browser 260, document editor 270, document editor 404, and/or client application 200 of the client device 120 receives a title for the new document. FIG. 5D shows that the user entered, "Paragraph 1" for the title for the new document. After receiving a title for the new document, the method 700 can proceed to block 712.

At block 712, determine if the selected portion contains one or more comments. For example, the processor 208, web browser 260, document editor 270, document editor 404, and/or client application 200 of the client device 120 determines if the selected portion contains one or more comments. For example, the processor 208, web browser 260, document editor 270, and/or client application 200 of the client device 120 can analyze the thread 518 to determine whether the selected portion includes one or more comments. For example, FIGS. 5A-5D shows a document containing comments. If the selected portion is determined to contain one or more comments, then the method 700 can proceed to method 800. If the selected portion is determined to not contain a comment, then the method 700 can proceed to block 714.

At block 714, determine if the selected portion contains a table or part of a table. For example, the processor 208, web browser 260, document editor 270, document editor 404, and/or client application 200 of the client device 120 determines whether the selected portion contains a table or part of a table. If the selected portion is determined to contain a table or part of a table, then the method 700 can proceed to method 900. If the selected portion is determined to not contain a comment, then the method 700 can proceed to block 716.

At block 716, determine if the selected portion contains one or more edits. For example, the processor 208, web browser 260, document editor 270, document editor 404, and/or client application 200 of the client device 120 determines whether the selected portion contains one or more edits. If the selected portion is determined to contain one or more edits, then the method 700 can proceed to method 1000. If the selected portion is determined to not contain one or more edits, then the method 700 can proceed to block 718.

At block 718, create a new document with the selected portion inserted into the new document. For example, the processor 208, web browser 260, document editor 270, and/or client application 200 of the client device 120 creates a new document with the selected portion inserted into the new document. In one or more embodiments, the entered title can be inserted as a title of the new document. In one or more embodiment, the newly created document does not contain a title. After creating the new document, the method 700 can proceed to block 720.

At block 720, determine a folder storing the rendered document. For example, the processor 208, web browser 260, document editor 270, document editor 404, and/or client application 200 of the client device 120 accesses a database table organized by documentIDs to determine a folder storing the rendered document or the folder that is associated with the rendered document. The new document is stored in or associated with the same folder as the rendered document. After determining a folder associated with the rendered document, the method 700 can proceed to block 722.

At block 722, determine one or more users associated with the rendered document. For example, the processor 208, web browser 260, document editor 270, document editor 404, and/or client application 200 of the client device 120 accesses the database table organized by documentIDs to determine one or more users who are associated with the rendered document. After determining one or more users associated with the rendered document, the method 700 can proceed to block 724.

At block 724, determine the rights of each associated user. For example, the processor 208, web browser 260, document editor 270, document editor 404, and/or client application 200 of the client device 120 accesses the database table organized by documentsIDs to determine the rights or privileges of each associated user. After determining the privileges of each associated user, the method 700 can proceed to block 726.

Figure 11A:
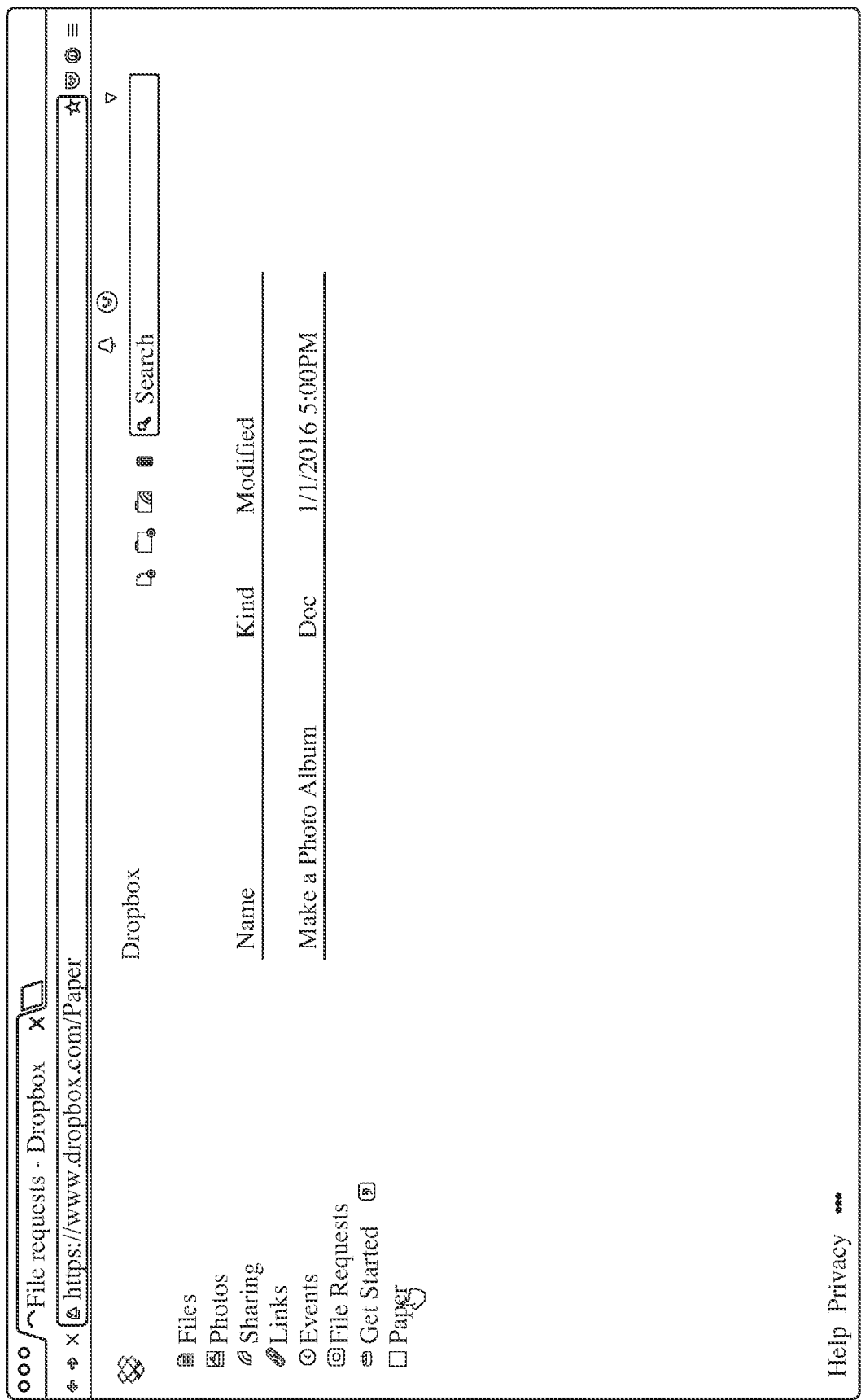
FIG. 11A is a file listing user interface prior to a new document being created in accordance with an exemplary embodiment.
Figure 11B:
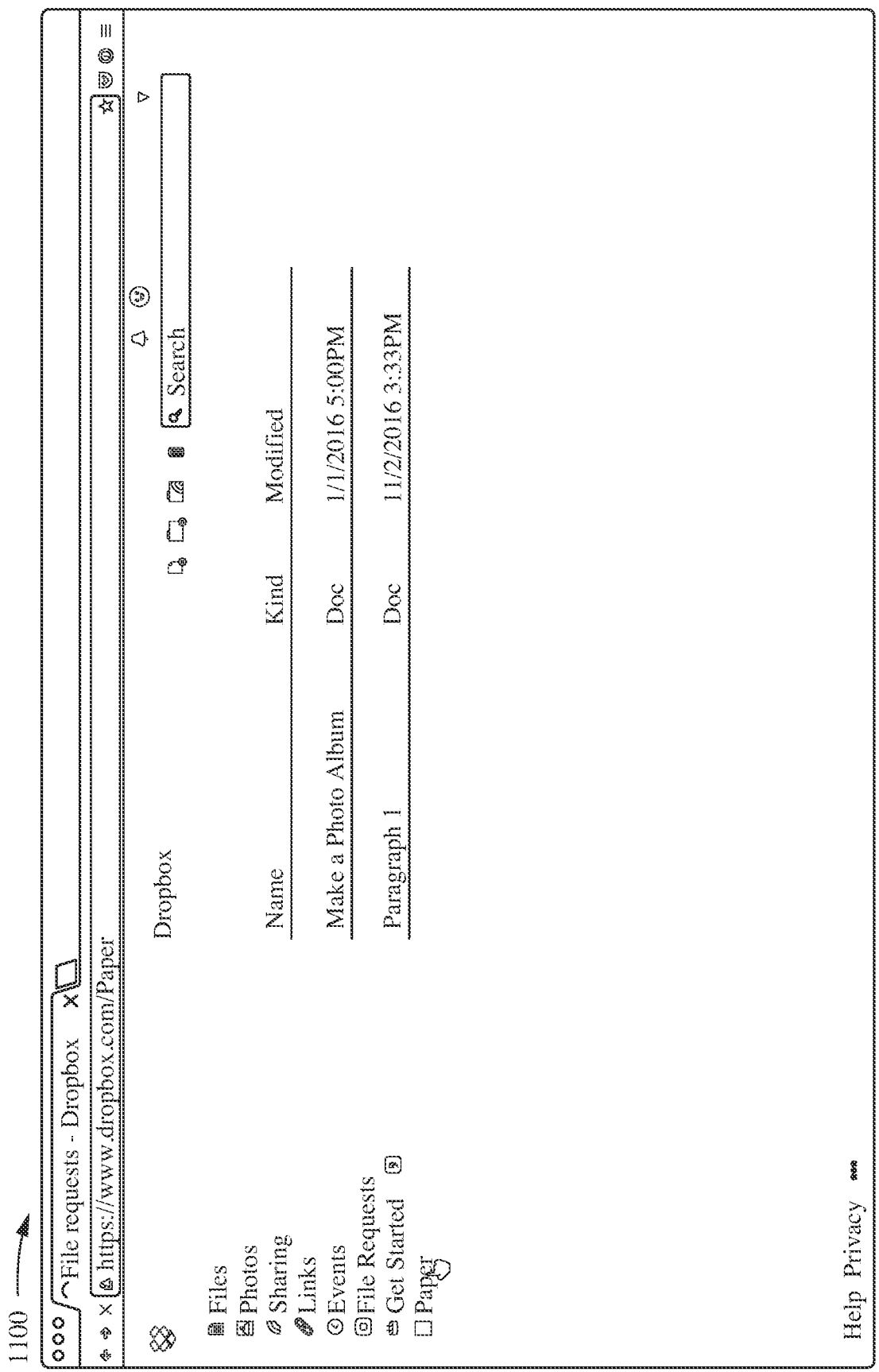
FIG. 11B is a file listing user interface after a new document is created in accordance with an exemplary embodiment.

At block 726, save the new document and the associations for the new document. For example, the processor 208, web browser 260, document editor 270, document editor 404, and/or client application 200 of the client device 120 saves the new document and the associations for the new document. The associations can include one or more comments for the new document, the folder that the rendered document and the new document are associated with, the users that the rendered document and the new document are associated with, and the rights of the users that are associated with the rendered document and the new document. For example, entries can be added to the database table to reflect the associations of the new document, which correspond to the associations of the rendered document. As a result, the comments related to the selected portion are associated with the new document, the users associated with the rendered document are also associated with the new document, as well as the permissions associated with each user. Thus, if users have read only privileges with the rendered document, then the users will have read only privileges with the rendered document. Similarly, if users have read/write privileges with the rendered document, then the users will have read/write privileges with the new document. The author can change the privileges for the rendered document and/or the new document at a later time. In one embodiment, if the privileges are changed on one of the documents, e.g., the rendered document or the new document, the change is also changed for the related document. In another embodiment, privileges can be changed on a per document basis. Thus, if the author changes privileges on the rendered document, the privileges on the new document are not changed. FIG. 11A shows a folder having a listing of the files under a Photos folder with only the rendered document (e.g., Make a Photo Album) listed in the listing. FIG. 11B shows the Photos folder with both the rendered document (e.g., Make a Photo Album) and new document (e.g., Paragraph 1) listed under the Photos folder. After saving the new document and associating the new document and rendered document, the method 700 can proceed to block 728.

Figure 5E:
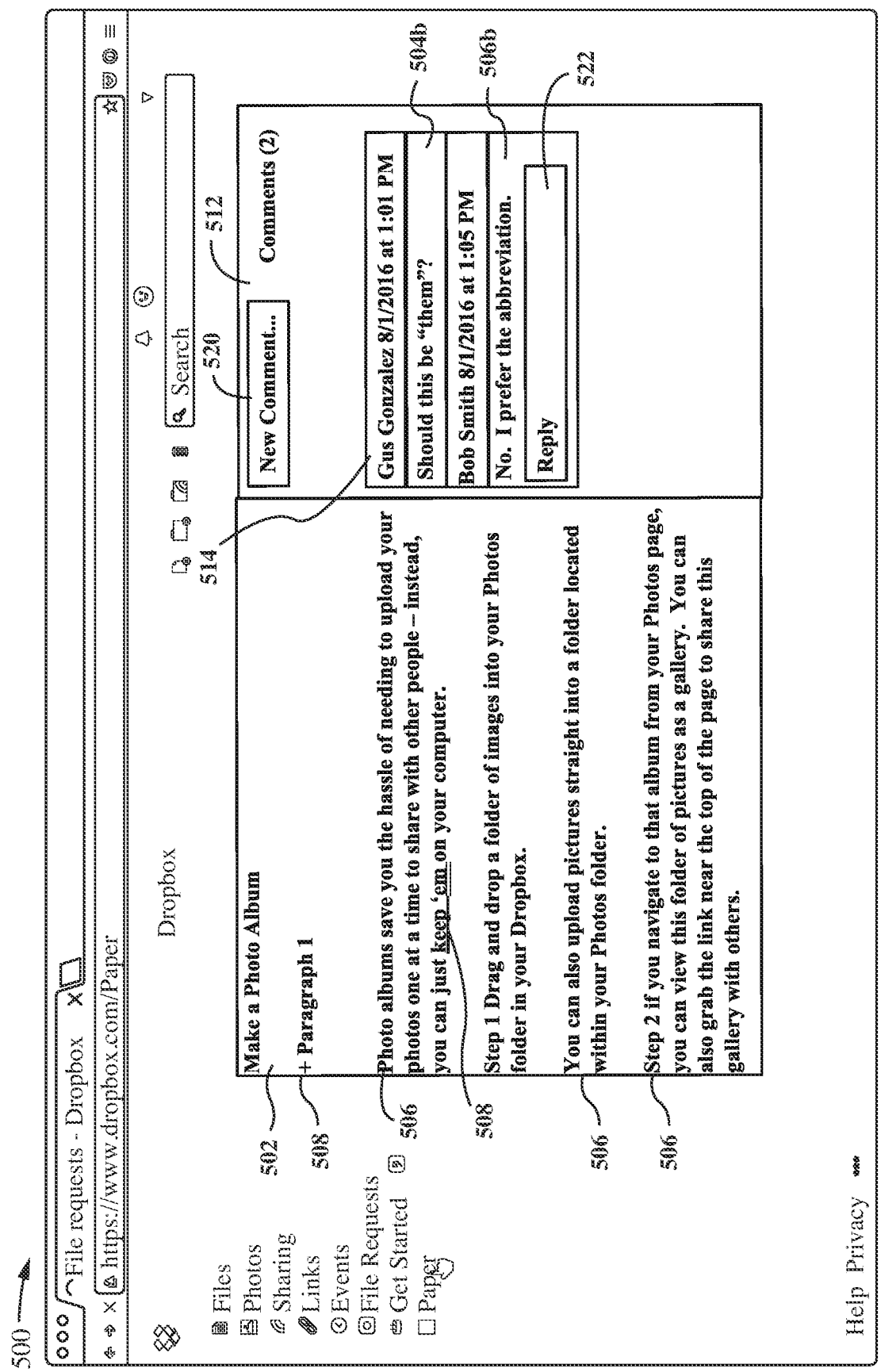
FIG. 5E is a user interface rendering a page of a document and a link to a new document in accordance with an exemplary embodiment.
Figure 5F:
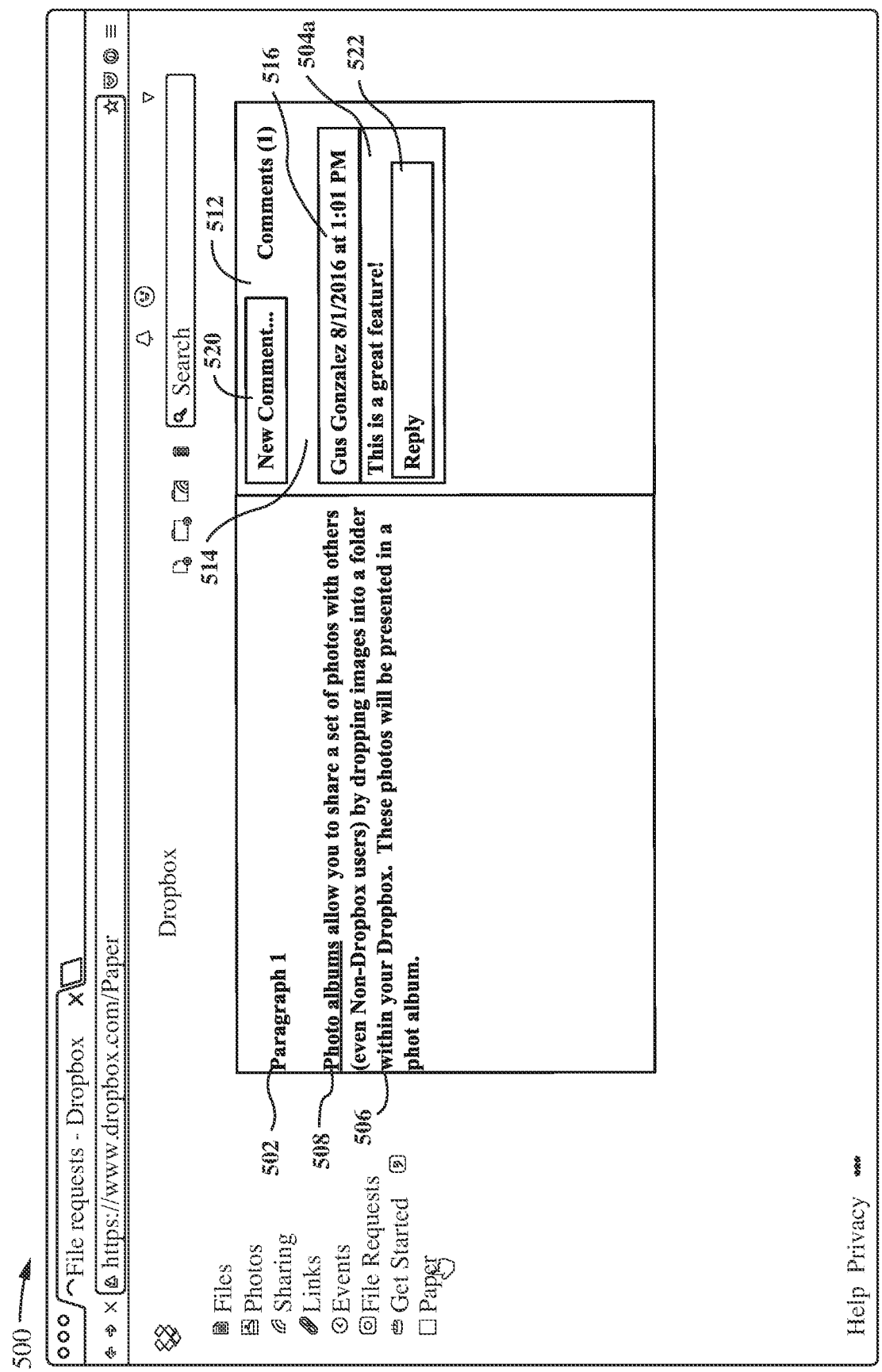
FIG. 5F is a user interface rendering a page of a new document in accordance with an exemplary embodiment.
Figure 5G:
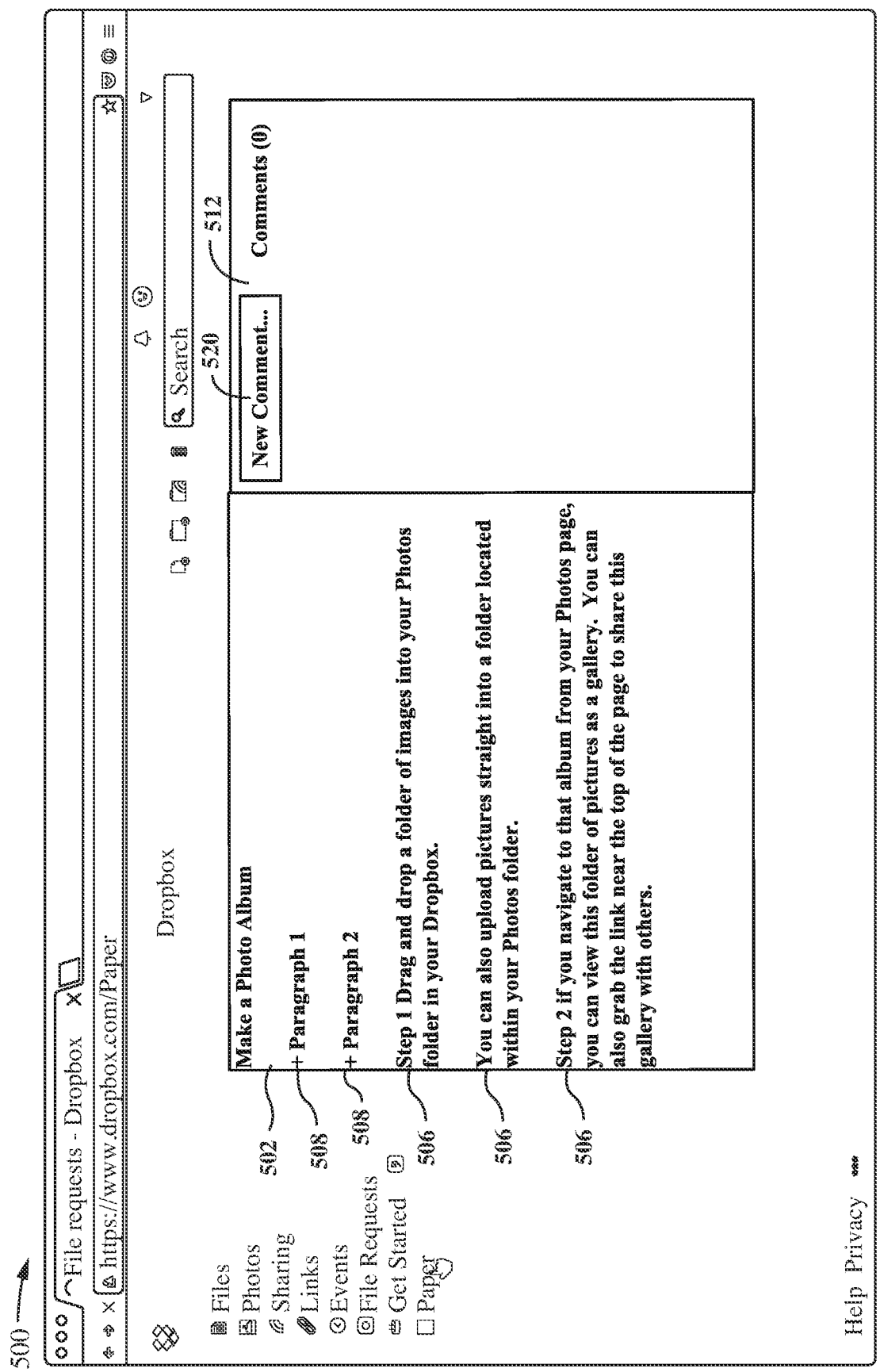
FIG. 5G is a user interface rendering a page of a document and two links to two new documents in accordance with an exemplary embodiment.
Figure 5H:
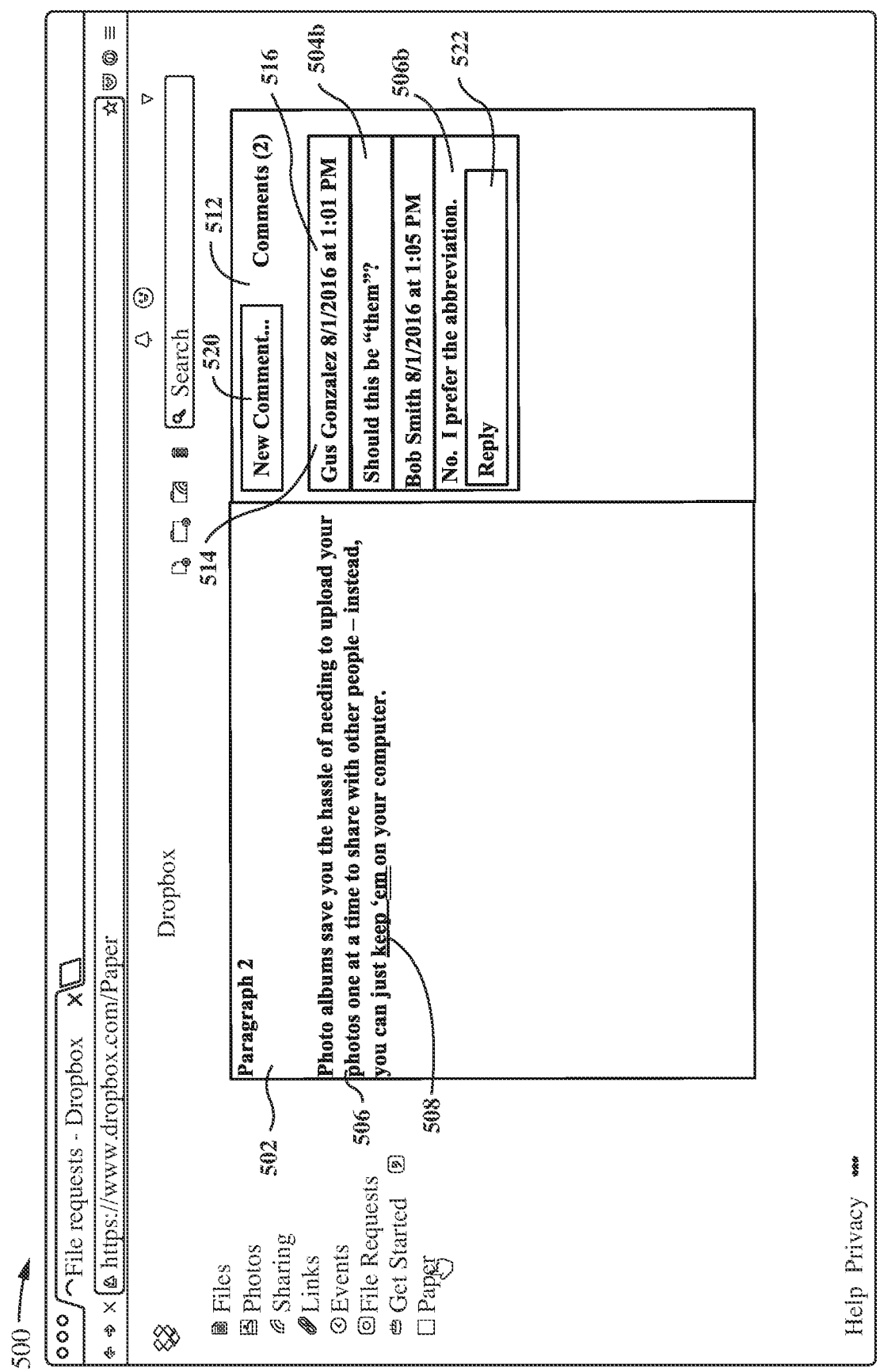
FIG. 5H is a user interface rendering a page of a second new document in accordance with an exemplary embodiment.

At block 728, replace the selected portion in the rendered document with a link to the new document. For example, the processor 208, web browser 260, document editor 270, document editor 404, and/or client application 200 of the client device 120 replaces the selected portion with the a link in the rendered document. The selected portion is replaced with the title, with the title being a link to the new document. The link can be a hyperlink. FIG. 5E shows the selected portion being replaced with the title in the rendered document. As shown, "Paragraph 1" replaces the selected portion and "+ Paragraph 1" is shown as a link to the new document. The "+" can provide an indication that "Paragraph 1" is a link to the document entitled "Paragraph 1." In other embodiments, other indicators can be used in place of the "+" to provide an indication of a document link. In yet another embodiment, no other indicator is rendered, thus "Paragraph 1" would be a link to the new document. FIG. 5F shows the Paragraph 1 document which includes the comments that are associated with the text spans that were part of the selected portion of the rendered document. FIG. 5G shows the "Make a Photo Album" with both the first paragraph and second paragraph being replaced with links, e.g., "+ Paragraph 1" and "+ Paragraph 2", respectively. FIG. 5H shows the "Paragraph 2" document which includes the comments that are associated with the text spans that were part of the selected portion of the rendered document. One of ordinary skill in the art would recognize that selected portions of the rendered document could be replaced with document links. For example, the first and third paragraphs can be replaced or the first sentence and second sentence of the first paragraph can be replaced with document links. After replacing the selected portion with the title in the rendered document, the method 700 can proceed to block 730.

At block 730, save the rendered document and the associations for the rendered document. For example, the processor 208, web browser 260, document editor 270, document editor 404, and/or client application 200 of the client device 120 saves the new document and the associations for the rendered document. The associations can include the association of the linked documents, e.g., Paragraph 1 and Paragraph 2. Since the comments associated with the text spans that are now associated with the new documents, the threads 518 and comments 504 are updated.

Figure 8:
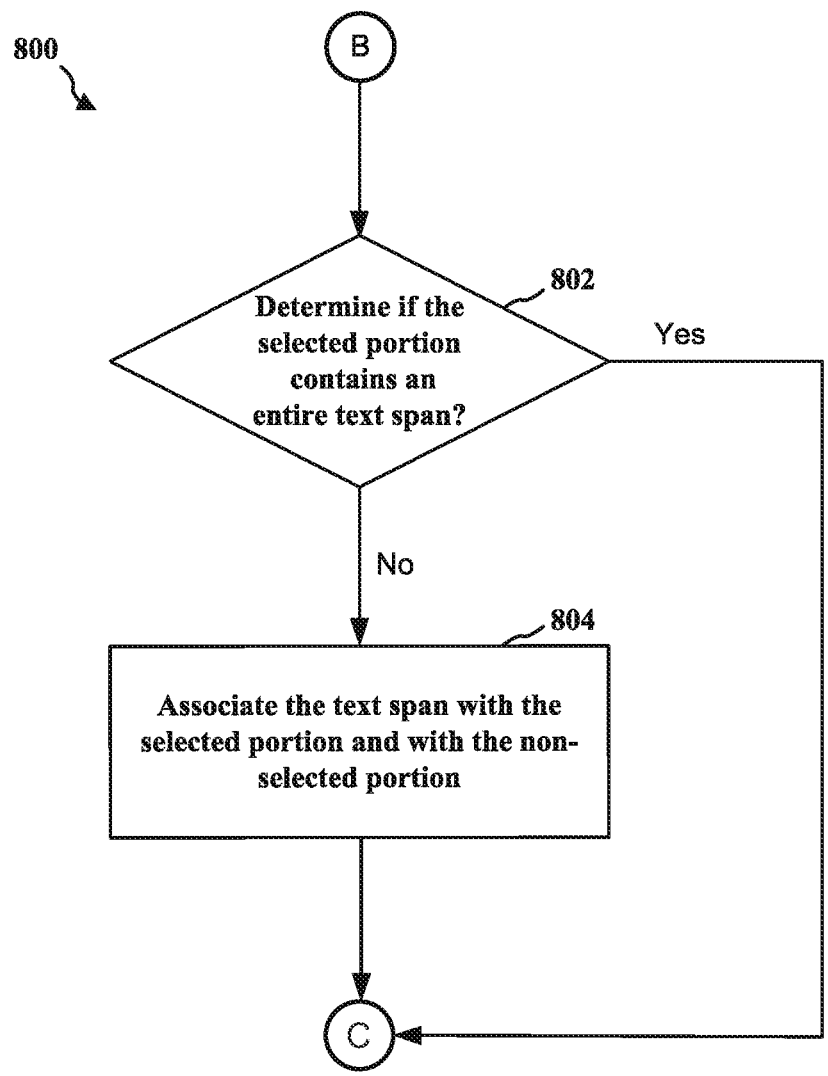
FIG. 8 is a flow diagram of a method for handling comments in accordance with an exemplary embodiment.

Referring to FIG. 8, a flowchart for a method for moving comments from a rendered document to a new document in accordance with an exemplary embodiment is illustrated. Exemplary method 800 is provided by way of example, as there are a variety of ways to carry out the method. Method 800 described below can be carried out using the configurations illustrated in FIGS. 1-4 by way of example, and various elements of these figures are referenced in explaining exemplary method 800. Each block shown in FIG. 8 represents one or more processes, methods or subroutines, carried out in exemplary method 800. Exemplary method 800 can begin at block 802.

At block 802, determine if the selected portion contains an entire text span. For example, the processor 208, web browser 260, document editor 270, document editor 404, and/or client application 200 of the client device 120 determines if the selected portion contains an entire text span. The processor 208, web browser 260, document editor 270, and/or client application 200 of the client device 120 can determine if the text span is within the selected portion of the rendered document. For example, the processor 208, web browser 260, document editor 270, and/or client application 200 of the client device 120 can determine if the starting point and ending point of the text span is within the starting point and ending point of the selected portion of the rendered document. If the selected portion contains the entire text span, then the method 800 can proceed to block 714 of FIG. 7B. If the selected portion does not contain the entire text span, then the method 800 can proceed to block 804.

Figure 9:
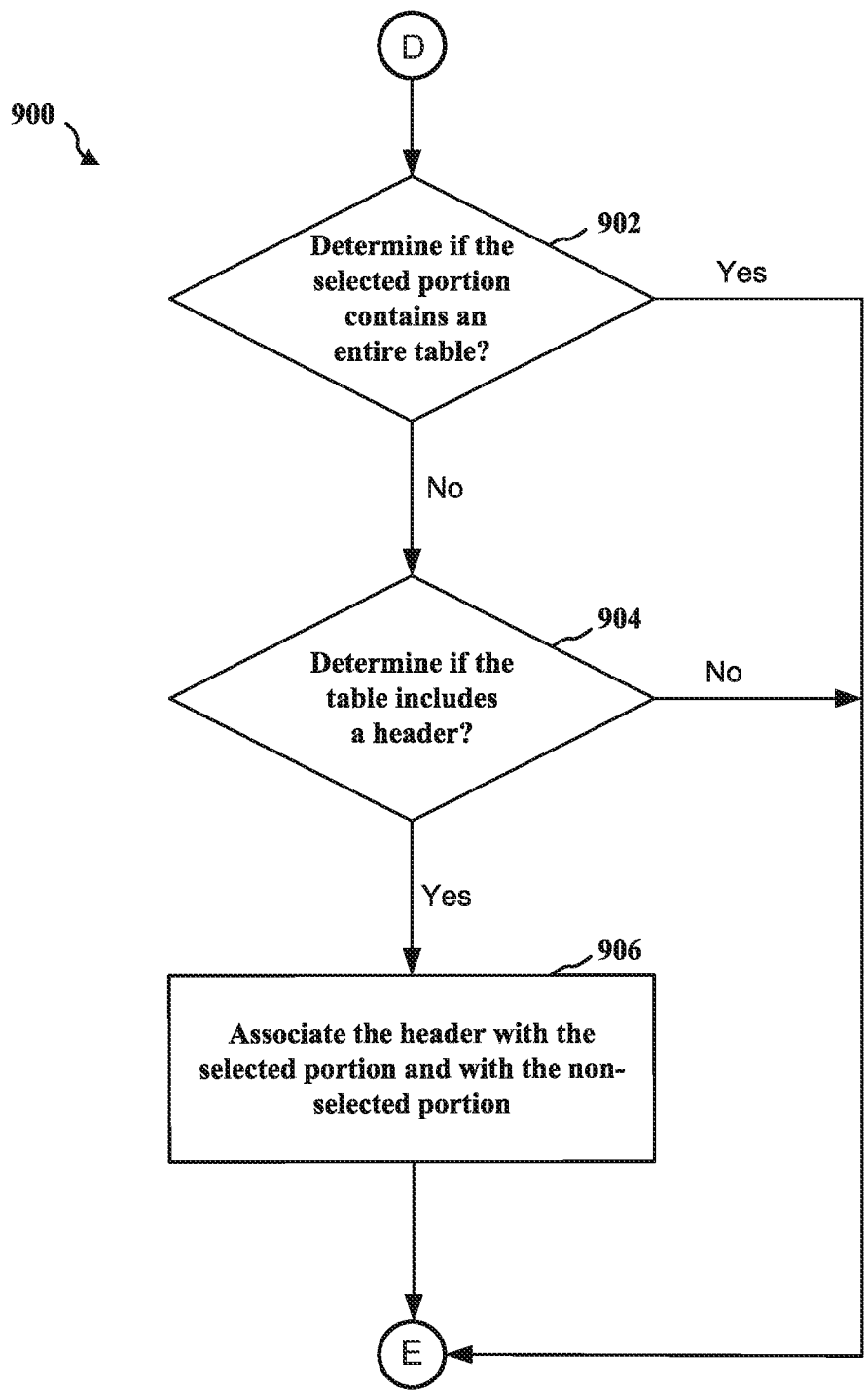
FIG. 9 is a flow diagram of a method for handling a table in accordance with an exemplary embodiment.

At block 804, associate the text span with the selected portion and with the non-selected portion. For example, the processor 208, web browser 260, document editor 270, document editor 404, and/or client application 200 of the client device 120 associates the text span with the selected portion and the with the non-selected portion. By associating the text span with both the selected portion and with the non-selected portion, the comment will be rendered in the rendered document and will be rendered in the new document when the new document is accessed. After associating the text span with the selected portion and with the non-selected portion, the method 800 can proceed to block 714 of FIG. 7B Referring to FIG. 9, a flowchart for a method for executing a shortcut to move a selection containing a table into a new document in accordance with an exemplary embodiment is illustrated. Exemplary method 900 is provided by way of example, as there are a variety of ways to carry out the method. Method 900 described below can be carried out using the configurations illustrated in FIGS. 1-4 by way of example, and various elements of these figures are referenced in explaining exemplary method 900. Each block shown in FIG. 9 represents one or more processes, methods or subroutines, carried out in exemplary method 900. Exemplary method 900 can begin at block 902.

At block 902, determine if the selected portion contains an entire table. For example, the processor 208, web browser 260, document editor 270, document editor 404, and/or client application 200 of the client device 120 determines if the selected portion contains an entire table. The processor 208, web browser 260, document editor 270, document editor 404, and/or client application 200 of the client device 120 can determine if the table is within the selected portion of the rendered document. For example, the processor 208, web browser 260, document editor 270, document editor 404, and/or client application 200 of the client device 120 can determine if the starting point and ending point of the table is within the starting point and ending point of the selected portion of the rendered document. If the selected portion contains the entire table, then the method 900 can proceed to block 716 of FIG. 7B If the selected portion does not contain the entire table, then the method 900 can proceed to block 904.

Figure 12A:
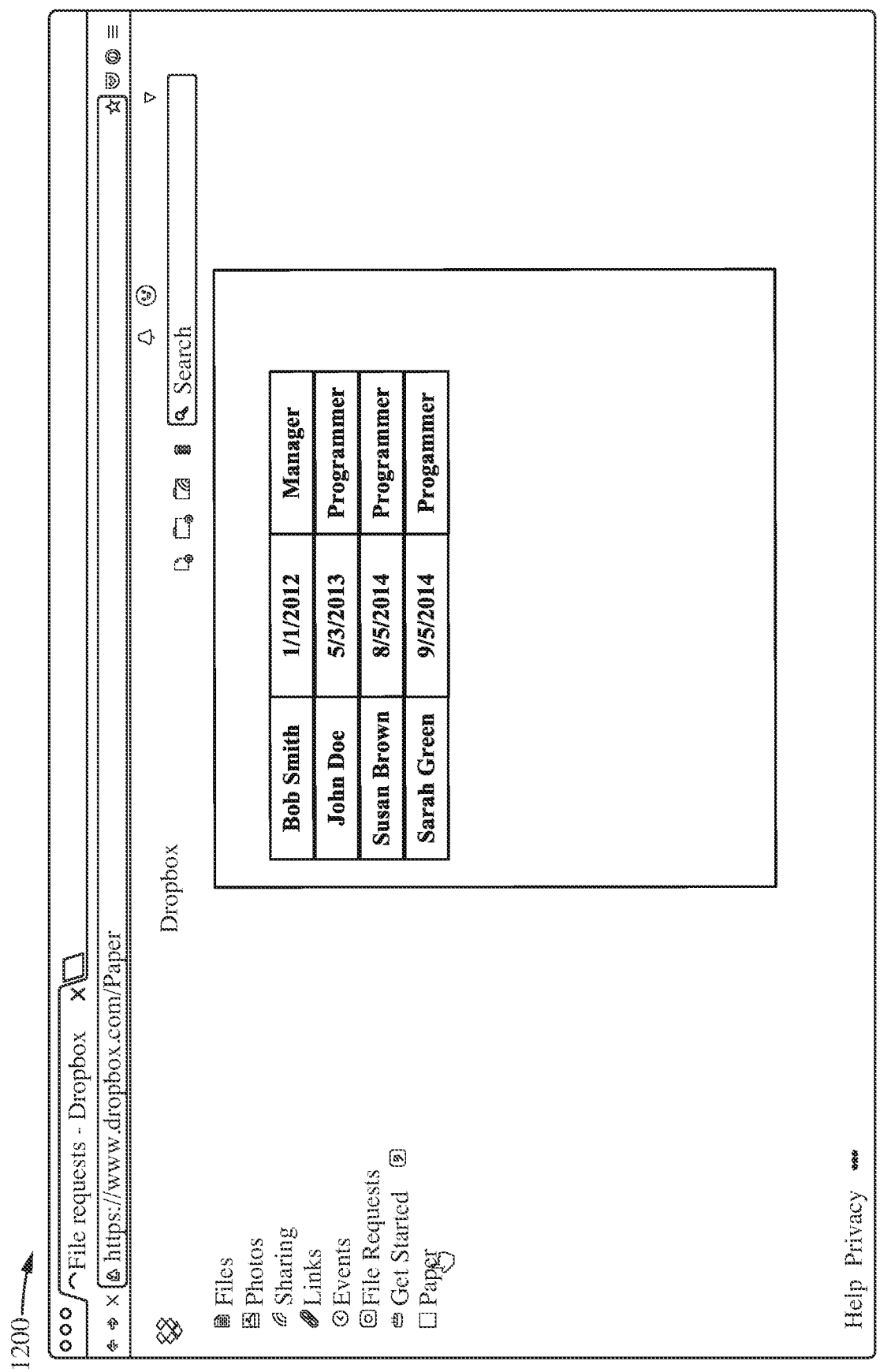
FIG. 12A is a user interface rendering a document with a table in accordance with an exemplary embodiment.
Figure 12B:
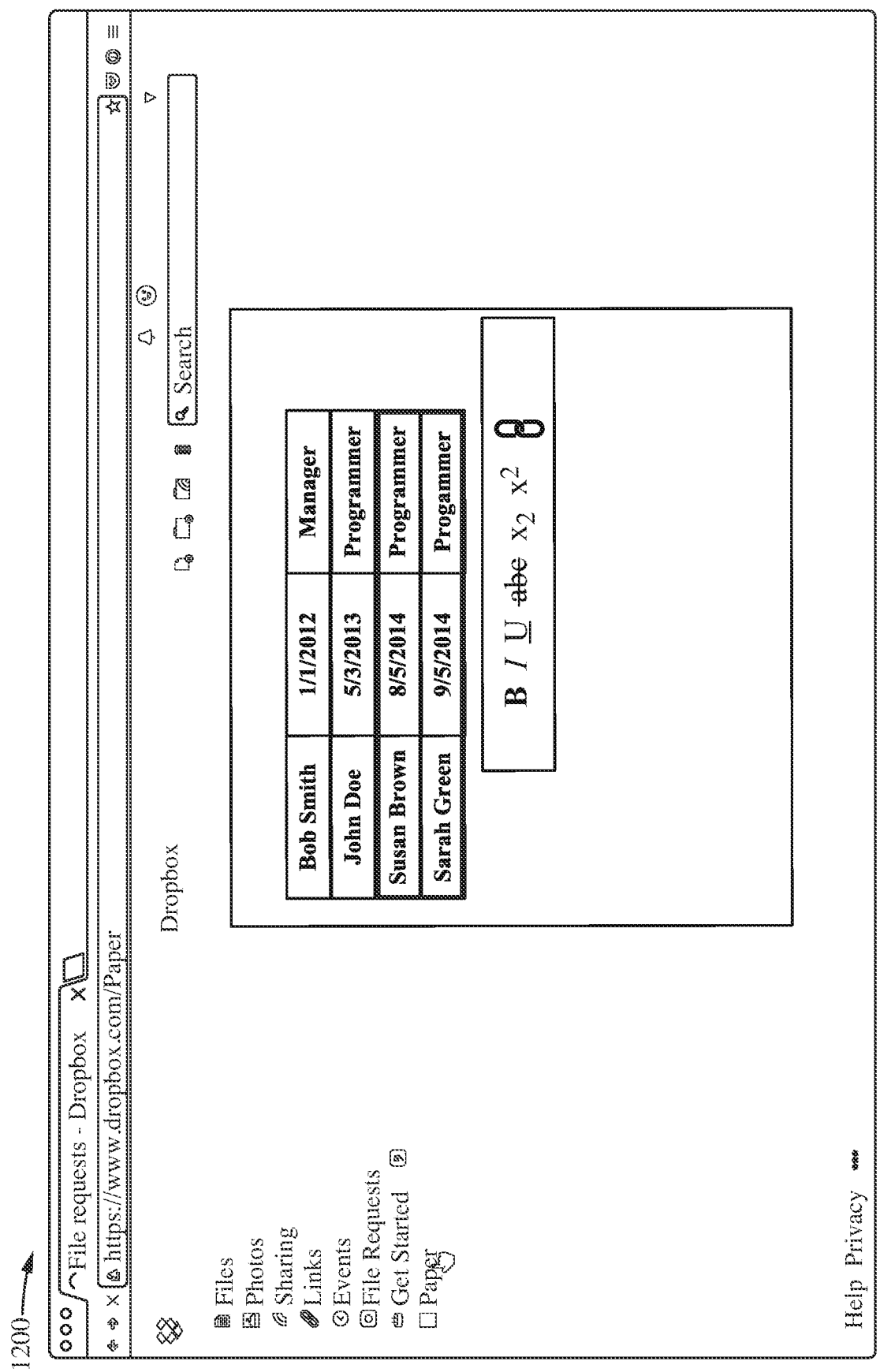
FIG. 12B is a user interface rendering a document with part of a table selected and a menu in accordance with an exemplary embodiment.
Figure 12C:
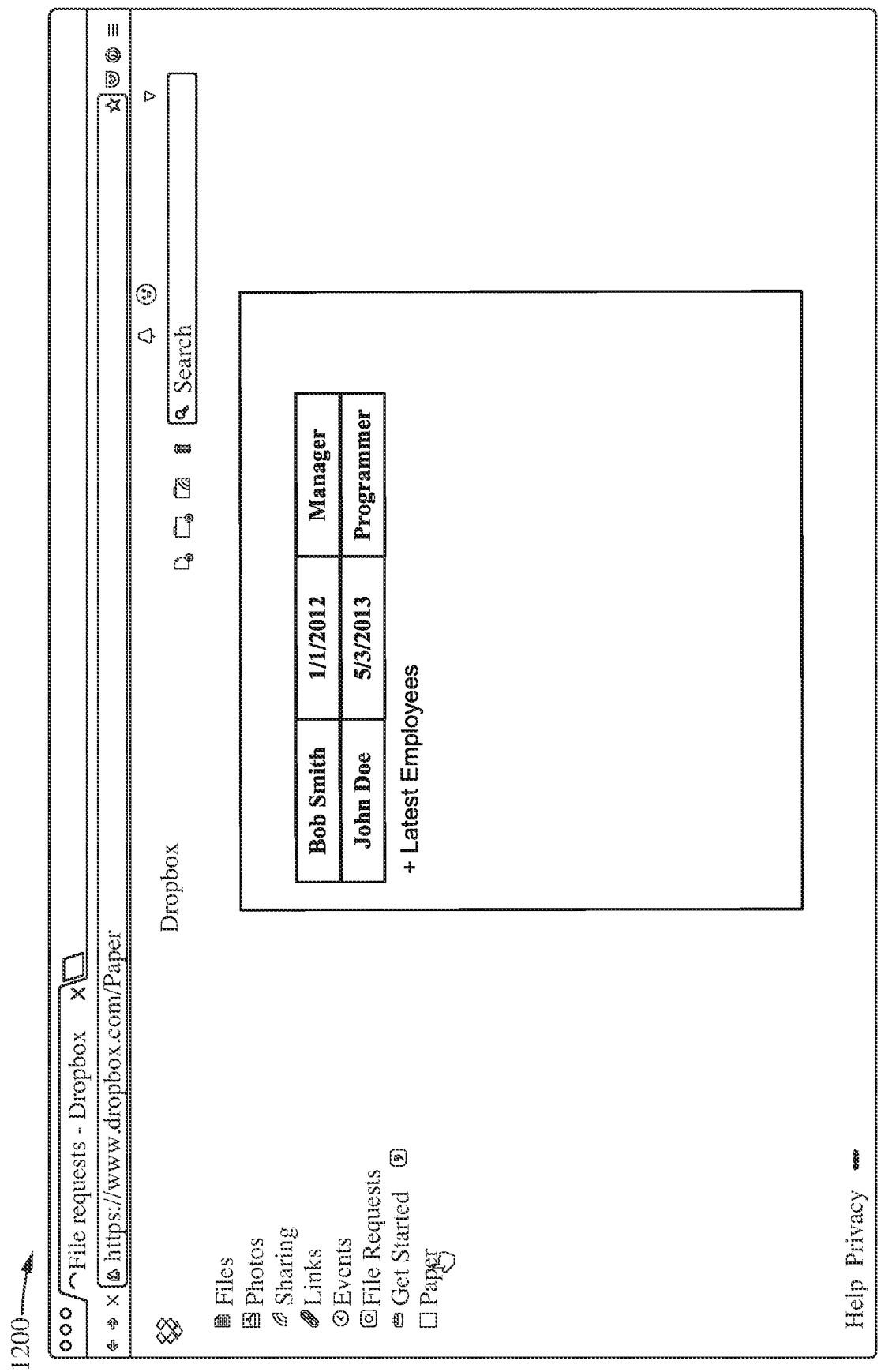
FIG. 12C is a user interface rendering a document with a new document link in accordance with an exemplary embodiment.
Figure 12D:
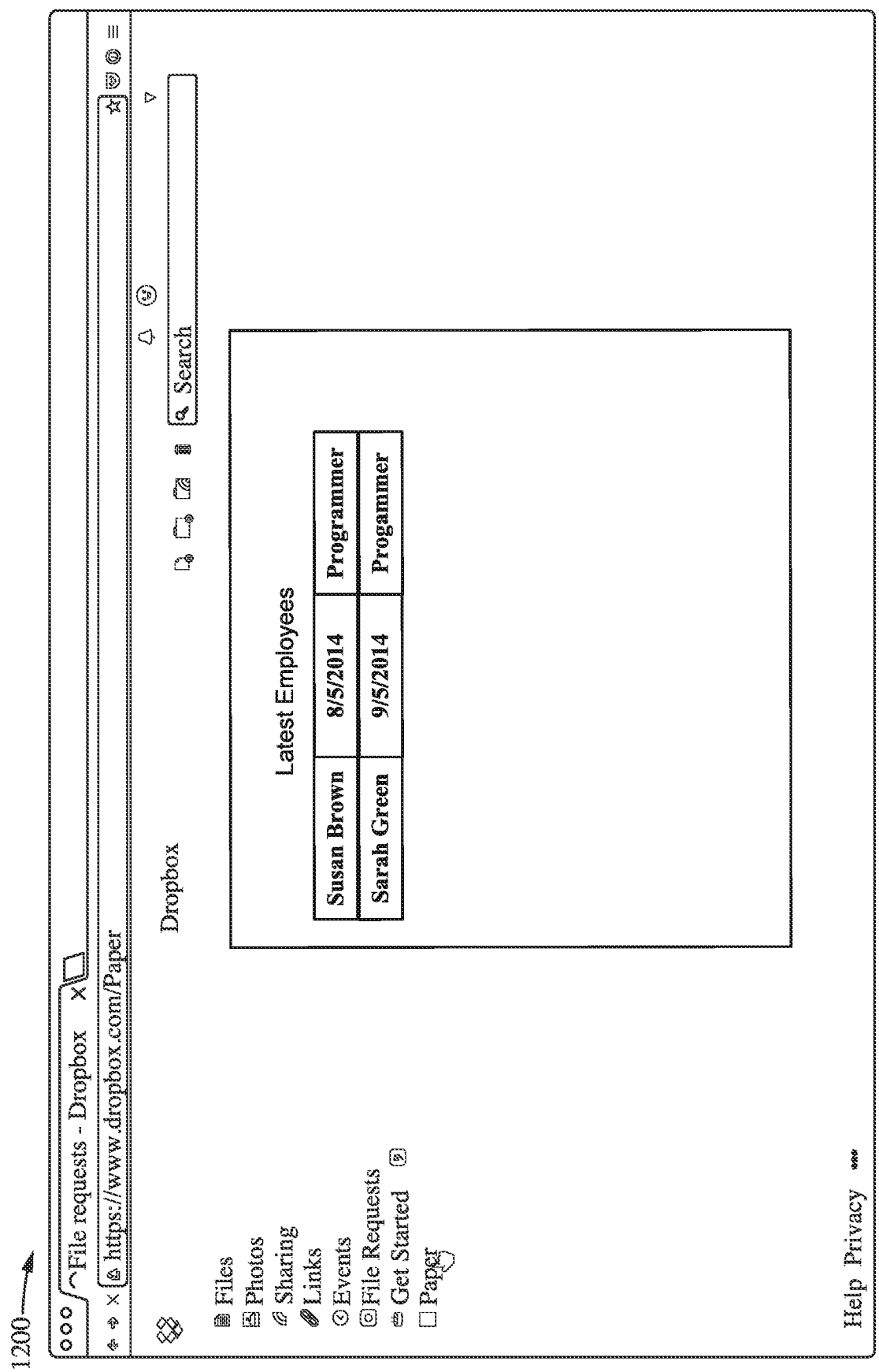
FIG. 12D is a user interface rendering a new document in accordance with an exemplary embodiment.
Figure 13A:
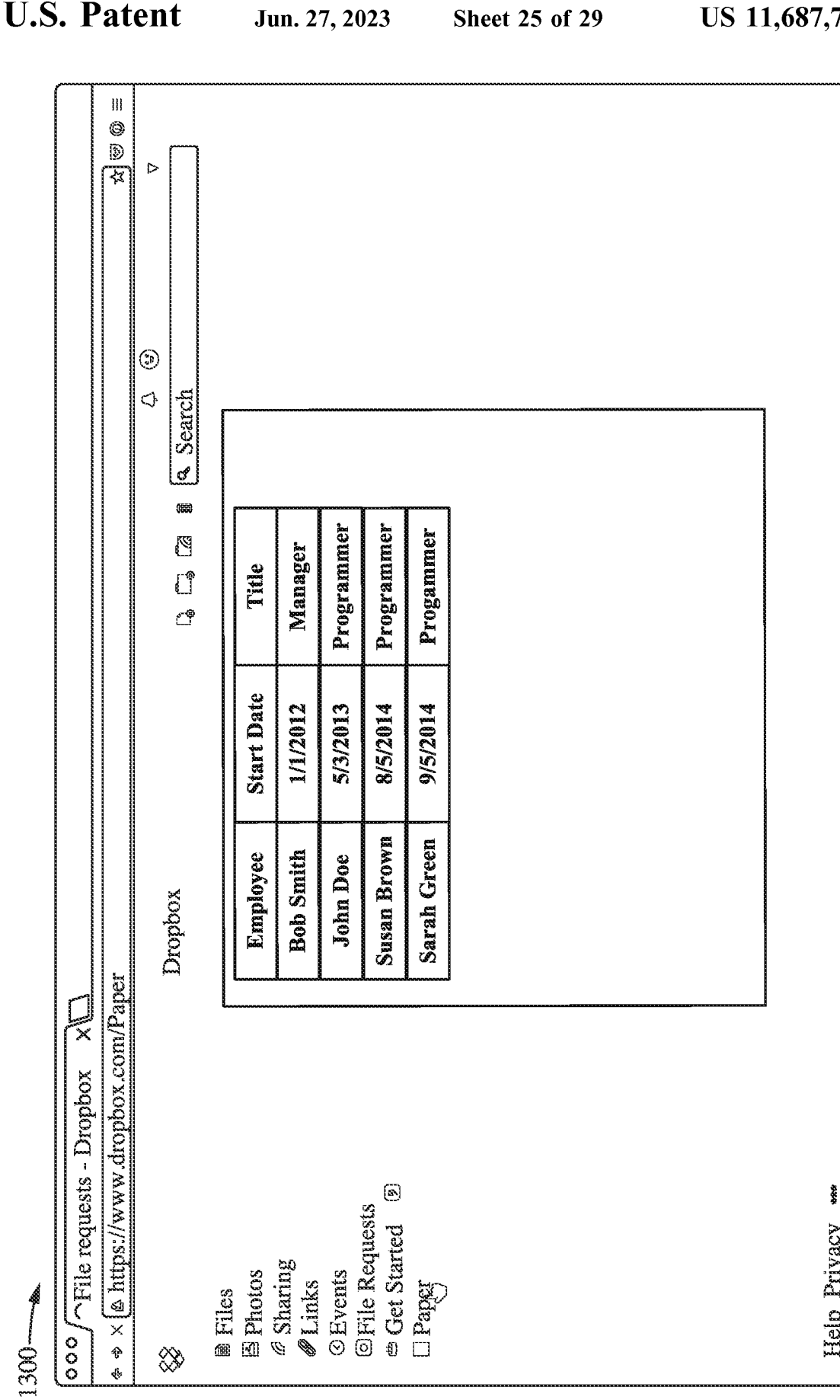
FIG. 13A is a user interface rendering a document with a table having a header in accordance with an exemplary embodiment.

At block 904, determine if the table includes a header. For example, the processor 208, web browser 260, document editor 270, document editor 404, and/or client application 200 of the client device 120 determines if the table includes a header. For example, FIG. 12A shows a document having a table without headers and FIG. 13A shows a document having a table with headers. FIG. 12B shows a table, without a header, and with a selected portion that is not the entire table, e.g., the rows with Susan Brown and Sarah Green being selected. In the rendered document, the selected portion will be replaced with a new link to the new document and the new document will include the table entries that were selected from the rendered document in accordance with method 700. FIG. 12C shows the rendered document with part of the original table and a link to the new document, entitled "Latest Employees." FIG. 12D shows a new document entitled, Latest Employees, with the two table entries that were selected from the rendered document. If the table does not include a header, then the method 900 can proceed to block 716 of FIG. 7B. If the table includes a header, then the method 900 can proceed to block 906.

Figure 13B:
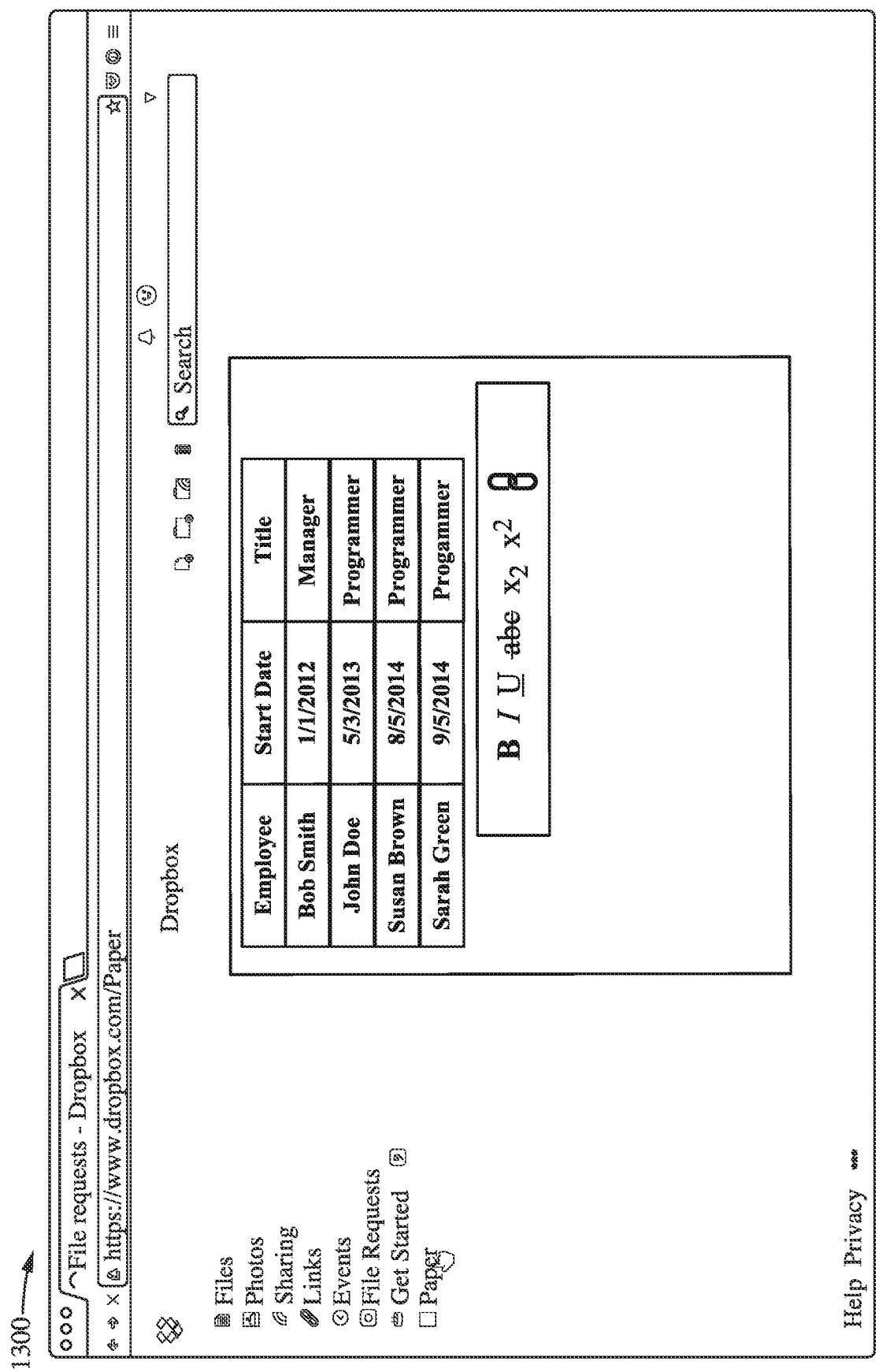
FIG. 13B is a user interface rendering a document with part of a table selected, the table having a header and a menu in accordance with an exemplary embodiment.
Figure 13C:
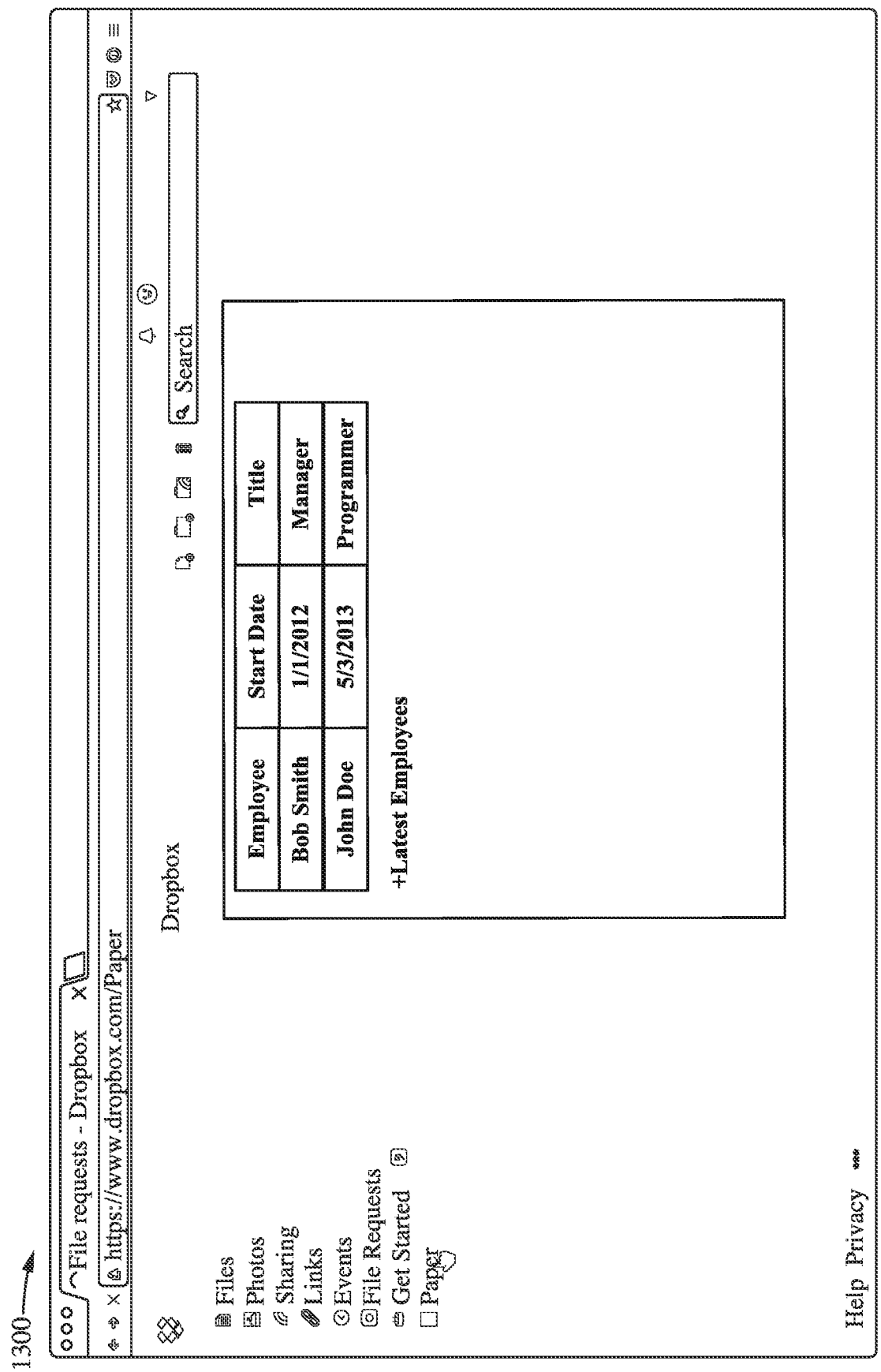
FIG. 13C is a user interface rendering a document with a new document link for table having a header in accordance with an exemplary embodiment.
Figure 13D:
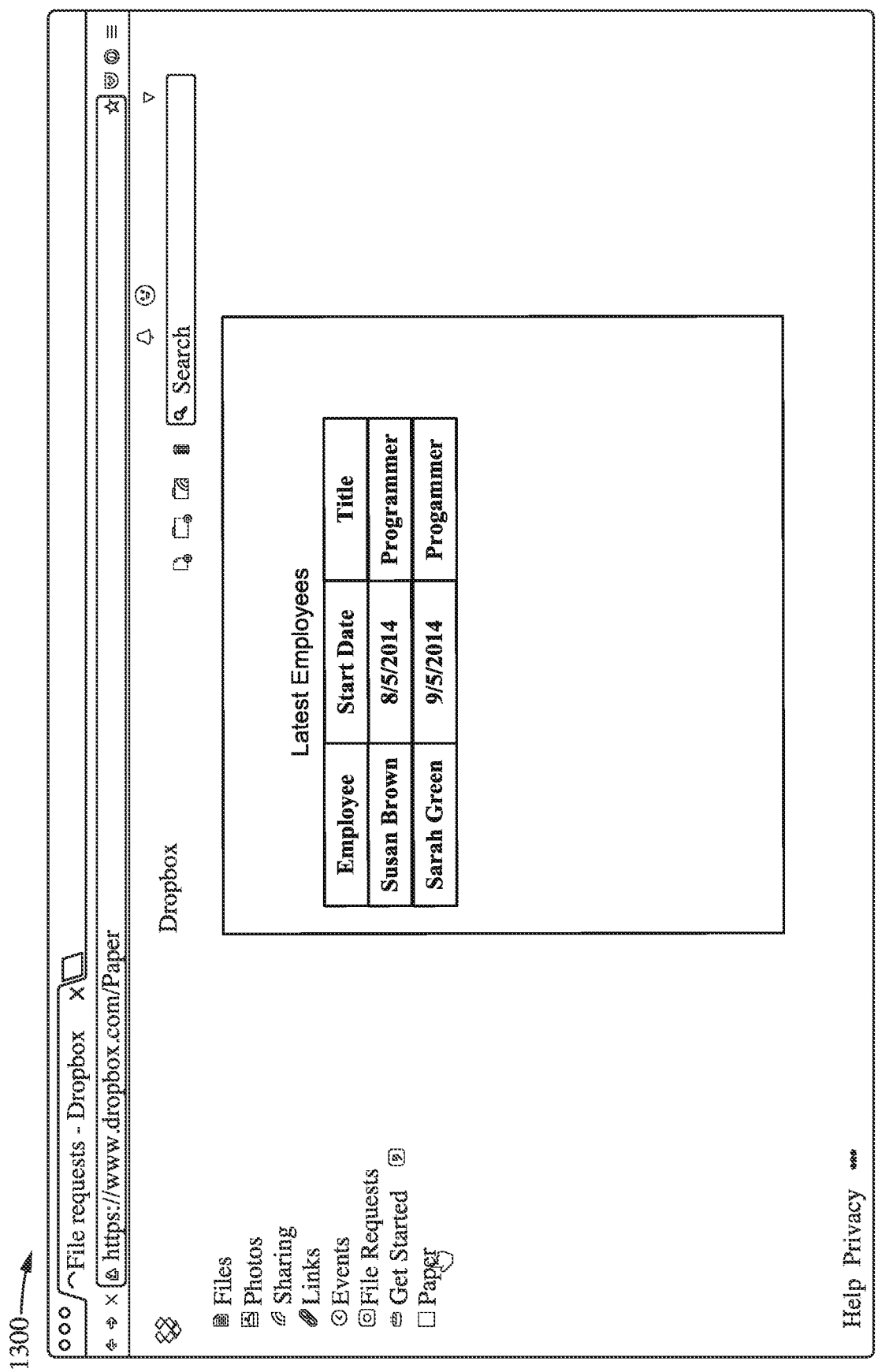
FIG. 13D is a user interface rendering a new document having a table with a header in accordance with an exemplary embodiment.
Figure 14A:
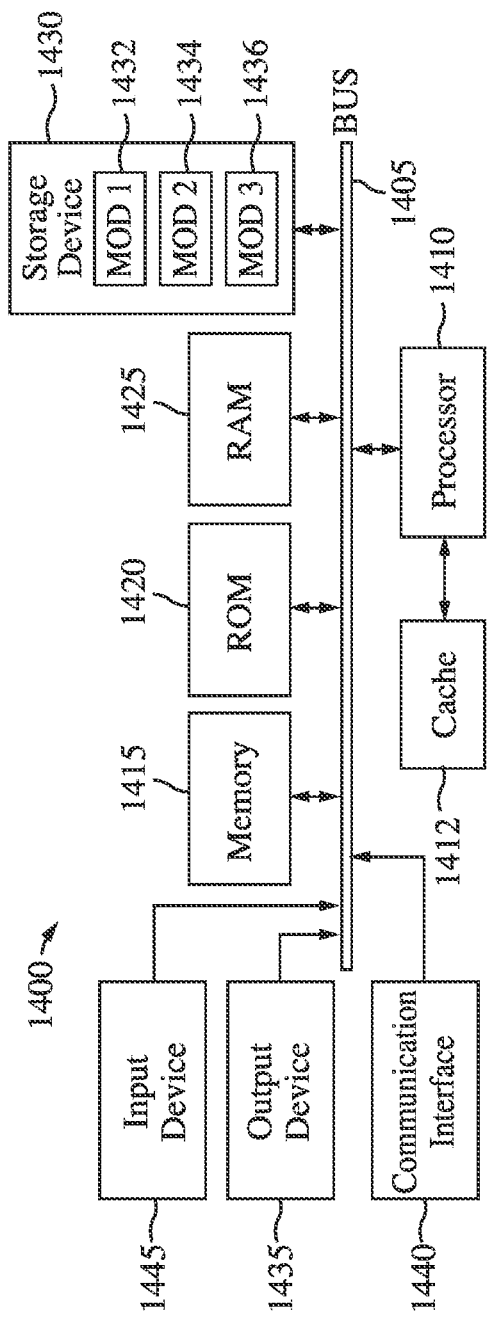
FIG. 14A is a block diagram of a system for implementing various embodiments of the present technology in accordance with an exemplary embodiment.
Figure 14B:
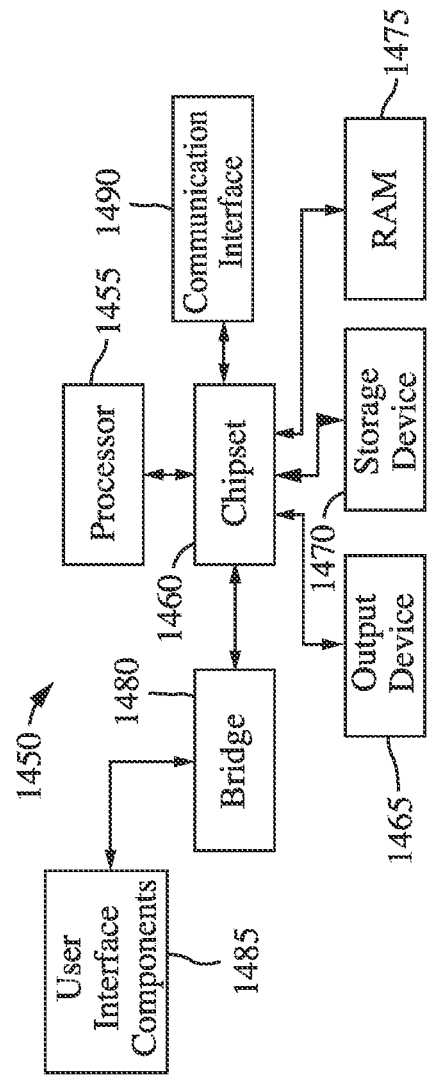
FIG. 14B is a block diagram of a system for implementing various embodiments of the present technology in accordance with an alternative exemplary embodiment.

At block 906, associate the header with the selected portion and with the non-selected portion. For example, the processor 208, web browser 260, document editor 270, document editor 404, and/or client application 200 of the client device 120 associates the header with the selected portion and the with the non-selected portion. By associating the header with both the selected portion and with the non-selected portion, the header will be rendered in the rendered document and will be inserted in the new document in accordance with method 700. For example, if the selected portion of a table includes a header, then the header is copied and inserted into the source document and if the non-selected portion of the table includes a header, then the header is copied and inserted into the new document. FIG. 13B shows a table, with a header, and with a selected portion that is not the entire table, e.g., the rows with Susan Brown and Sarah Green being selected. FIG. 13C shows the rendered document with part of the original table, the header and a link to the new document, entitled "Latest Employees." FIG. 13D shows a new document entitled, Latest Employees, with the two table entries that were selected from the rendered document and the header. After associating the header with the selected portion and with the non-selected portion, the method 900 can proceed to block 716 of FIG. 7B.

Figure 10:
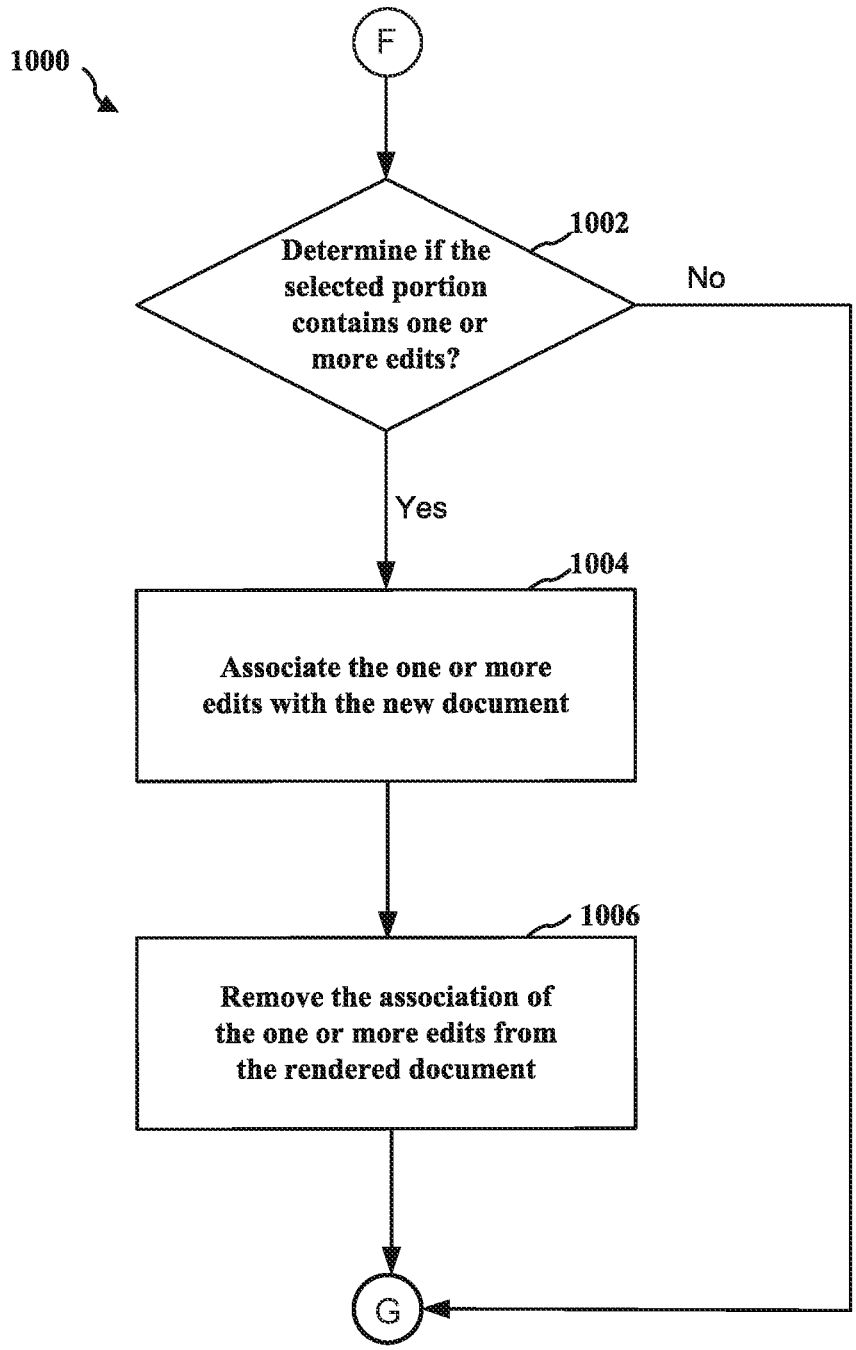
FIG. 10 is a flow diagram of a method for handling edits in accordance with an exemplary embodiment.

Referring to FIG. 10, a flowchart for a method for associating one or more edits with the new document in accordance with an exemplary embodiment is illustrated. Exemplary method 1000 is provided by way of example, as there are a variety of ways to carry out the method. Method 1000 described below can be carried out using the configurations illustrated in FIGS. 1-4 by way of example, and various elements of these figures are referenced in explaining exemplary method 1000. Each block shown in FIG. 10 represents one or more processes, methods or subroutines, carried out in exemplary method 700. Exemplary method 1000 can begin at block 1002.

At block 1002, determine if the selected portion contains one or more edits. For example, the processor 208, web browser 260, document editor 270, document editor 404, and/or client application 200 of the client device 120 determines if the selected portion contains one or more edits. If the selected portion does not contain edits, then the method 1000 can proceed to block 718 of FIG. 7B If the selected portion does contain one or more edits, then the method 1000 can proceed to block 1004.

At block 1004, associate the one or more edits with the new document. For example, the processor 208, web browser 260, document editor 270, document editor 404, and/or client application 200 of the client device 120 associates the one or more edits with the new document. By associating the edits with the new document, the one or more edits will be rendered in the new document when the new document is accessed. After associating the one or more edits with the new document, the method 1000 can proceed to block 1006.

At block 1006, remove the association of the one or more edits with the rendered document. For example, the processor 208, web browser 260, document editor 270, document editor 404, and/or client application 200 of the client device 120 removes the association of the one or more edits with the rendered document. After removing the association of the one or more edits with the rendered document, the method 1000 can proceed to block 718 of FIG. 7B.

Exemplary System

FIGS. 11A and 11B show exemplary possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that exemplary systems 1100 and 1150 can have more than one processor 1110 or be part of a group or cluster of computing devices networked together to provide greater processing capability.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other processes, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   providing, by a content management system, a first document within a document editor, wherein the first document is editable and content of the first document is synchronized with a particular set of user accounts comprising a particular set of rights for the first document;
   receiving, by the content management system, user input indicating a selection of a portion of the first document;
   receiving, by the content management system, user input indicating a linked document command associated with the selection of the portion of the first document; and
   in response to receiving the user input indicating the linked document command:
     creating, within the content management system, a new linked document comprising the portion of the first document, wherein the new linked document is editable and content of the new linked document is automatically synchronized with the particular set of user accounts;
     automatically assigning the particular set of rights corresponding to the particular set of user accounts for the new linked document, wherein the particular set of rights updates for the particular set of user accounts for both the new linked document and the first document upon receiving an update to the particular set of rights for either the new linked document or the first document;
     generating a link corresponding to a storage location of the new linked document within the content management system; and
     replacing the portion in the first document with the link corresponding to the new linked document, such that when the first document is displayed in the document editor, the link is displayed within the first document in place of the portion, wherein the first document is associated with changes identified within the new linked document.

2. The computer-implemented method of claim 1, further comprising, providing, by the content management system, the new linked document for display within the document editor or within an additional document editor based on receiving user input indicating a selection of the link within the first document.

3. The computer-implemented method of claim 2, further comprising receiving, from a client device, user updates to content of the new linked document, wherein the user updates comprise the changes identified within the new linked document.

4. The computer-implemented method of claim 1, further comprising:
   based on receiving the user input indicating the linked document command:
     receiving a modified set of rights for the first document; and
     automatically assigning the modified set of rights for the new linked document.

5. The computer-implemented method of claim 1, further comprising:

based on receiving the user input indicating the linked document command:
  inserting an edit corresponding with the portion within the new linked document; and
  associating the edit with the portion in the new linked document.

6. The computer-implemented method of claim 1, further comprising, based on receiving user input indicating the selection of the portion, providing a menu comprising an option for the linked document command within the document editor.

7. The computer-implemented method of claim 1, further comprising:
  based on receiving the user input indicating the linked document command, inserting a format attribute associated with the first document within the new linked document.

8. The computer-implemented method of claim 1, further comprising, based on receiving a user interaction with the link within the first document, providing, for display, the content of the new linked document.

9. The computer-implemented method of claim 1, further comprising:
  storing the new linked document in a folder associated with the first document; and
  associating the new linked document with a user that is associated with the folder.

10. The computer-implemented method of claim 1, further comprising:
  based on receiving the user input indicating the linked document command:
    providing a prompt for a title for the new linked document;
    receiving, from a client device, a title for the new linked document; and
    associating the title for the new linked document with the new linked document.

11. A content management system comprising:
  at least one processor; and
  at least one non-transitory computer-readable storage medium storing instructions that, when executed by the at least one processor, cause the content management system to:
    provide a first document within a document editor, wherein the first document is editable and content of the first document is synchronized with a particular set of user accounts comprising a particular set of rights for the first document;
    receive user input indicating a selection of a portion of the first document;
    receive user input indicating a linked document command associated with the selection of the portion of the first document; and
    in response to receiving the user input indicating the linked document command:
      create a new linked document comprising the portion of the first document, wherein the new linked document is editable and content of the new linked document is automatically synchronized with the particular set of user accounts;
      automatically assigning the particular set of rights corresponding to the particular set of user accounts for the new linked document, wherein the particular set of rights updates for the particular set of user accounts for both the new linked document and the first document upon receiving an update to the particular set of rights for either the new linked document or the first document;
      generate a link corresponding to a storage location of the new linked document within the content management system; and
      replace the portion in the first document with the link corresponding to the new linked document, such that when the first document is displayed in the document editor, the link is displayed within the first document in place of the portion, wherein the first document is associated with changes identified within the new linked document.

12. The content management system of claim 11, further comprising instructions that, when executed by the at least one processor, cause the content management system to provide the new linked document for display within the document editor or within an additional document editor based on receiving user input indicating a selection of the link within the first document.

13. The content management system of claim 12, further comprising instructions that, when executed by the at least one processor, cause the content management system to receive updates, from a client device, to content of the new linked document, wherein the updates comprise the changes identified within the new linked document.

14. The content management system of claim 11, further comprising instructions that, when executed by the at least one processor, cause the content management system to:
  in response to receiving the user input indicating the linked document command:
    insert a comment into the new linked document; and
    associate the comment with the portion in the new linked document.

15. The content management system of claim 11, further comprising instructions that, when executed by the at least one processor, cause the content management system to provide a menu comprising an option for the linked document command within the document editor in response to receiving the user input indicating the selection of the portion of the first document.

16. A non-transitory computer-readable medium storing instructions that, when executed by at least one processor, cause a computer device to:
  provide a first document within a document editor, wherein the first document is editable and content of the first document is synchronized with a particular set of user accounts comprising a particular set of rights for the first document;
  receive user input indicating a selection of a portion of the first document;
  receive user input indicating a linked document command associated with the selection of the portion of the first document; and
  in response to receiving the user input indicating the linked document command:
    create a new linked document comprising the portion of the first document, wherein the new linked document is editable and content of the new linked document is automatically synchronized with the particular set of user accounts;
    automatically assigning the particular set of rights corresponding to the particular set of user accounts for the new linked document, wherein the particular set of rights updates for the particular set of user accounts for both the new linked document and the first document upon receiving an update to the particular set of rights for either the new linked document or the first document;

generate a link corresponding to a storage location of the new linked document within a content management system; and replace the portion in the first document with the link corresponding to the new linked document, such that when the first document is displayed in the document editor, the link is displayed within the first document in place of the portion, wherein the first document is associated with changes identified within the new linked document.

17. The non-transitory computer-readable medium of claim 16, further comprising instructions that, when executed by the at least one processor, cause the computer device to provide the new linked document for display within the document editor or within an additional document editor based on receiving user input indicating a selection of the link within the first document.

18. The non-transitory computer-readable medium of claim 17, further comprising instructions that, when executed by the at least one processor, cause the computer device to receive updates, from a client device, to content of the new linked document, wherein the updates comprise the changes identified within the new linked document.

19. The non-transitory computer-readable medium of claim 16, further comprising instructions that, when executed by the at least one processor, cause the computer device to:

in response to receiving the user input indicating the linked document command:

insert a comment into the new linked document; and associate the comment with the portion in the new linked document.

20. The non-transitory computer-readable medium of claim 16, further comprising instructions that, when executed by the at least one processor, cause the computer device to provide a menu comprising an option for the linked document command within the document editor in response to receiving the user input indicating the selection of the portion of the first document.

\* \* \* \* \*